United States Patent
Wigren

(10) Patent No.: US 9,578,535 B2
(45) Date of Patent: Feb. 21, 2017

(54) OTHER CELL INTERFERENCE ESTIMATION

(71) Applicant: Telefonaktiebolaget L M Ericsson (publ), Stockholm (SE)

(72) Inventor: Torbjörn Wigren, Uppsala (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 0 days.

(21) Appl. No.: 14/443,794

(22) PCT Filed: Nov. 23, 2012

(86) PCT No.: PCT/SE2012/051299
§ 371 (c)(1),
(2) Date: May 19, 2015

(87) PCT Pub. No.: WO2014/081362
PCT Pub. Date: May 30, 2014

(65) Prior Publication Data
US 2015/0281992 A1    Oct. 1, 2015

(51) Int. Cl.
*H04W 4/00* (2009.01)
*H04W 24/10* (2009.01)
(Continued)

(52) U.S. Cl.
CPC ............. *H04W 24/10* (2013.01); *H04B 15/00* (2013.01); *H04B 17/345* (2015.01); *H04L 43/0876* (2013.01); *H04W 52/365* (2013.01)

(58) Field of Classification Search
None
See application file for complete search history.

(56) References Cited

U.S. PATENT DOCUMENTS

2007/0177536 A1    8/2007  Brueck et al.
2008/0107030 A1    5/2008  Hong et al.
(Continued)

FOREIGN PATENT DOCUMENTS

EP    2 850 889 A1      3/2015
WO    WO 2007/024166    3/2007
WO    WO 2011/119075    9/2011

OTHER PUBLICATIONS

EPO Communication pursuant to Article 94(3) EPC for Application No. 12 888 922.7-1855, Oct. 21, 2015.
(Continued)

*Primary Examiner* — Anh-Vu Ly
(74) *Attorney, Agent, or Firm* — Patents on Demand, P.A.; Brian K. Buchheit; Scott M. Garrett

(57) ABSTRACT

The disclosure relates to a method and a node for estimating other cell interference in a radio network node (300) providing an own cell serving at least one radio device in a radio network. The method comprises measuring a load utilization, relating to the load utilized by said at least one radio device. The method also comprises estimating a load utilization probability based at least on the measured load utilization, a previously estimated load utilization probability and a previously estimated interference-and-noise sum. The method also comprises estimating an interference-and-noise sum based at least on the measured load utilization, a measured received total wideband power (RTWP) the estimated load utilization probability and the previously estimated interference-and-noise sum. The method also comprises checking whether the estimated load utilization probability and/or estimated interference-and-noise sum and/or any algorithm value derived from any of the estimates, is within a predefined range.

13 Claims, 10 Drawing Sheets

(51) Int. Cl.
*H04B 17/345* (2015.01)
*H04B 15/00* (2006.01)
*H04L 12/26* (2006.01)
*H04W 52/36* (2009.01)

(56) References Cited

U.S. PATENT DOCUMENTS

| | | | |
|---|---|---|---|
| 2008/0254788 A1 | 10/2008 | Wigren | |
| 2009/0176500 A1* | 7/2009 | Panico | H04W 16/02 455/446 |
| 2009/0305709 A1* | 12/2009 | Panico | H04W 16/18 455/446 |
| 2012/0147765 A1 | 6/2012 | Wigren | |
| 2013/0324175 A1* | 12/2013 | Wigren | H04W 72/1252 455/509 |
| 2014/0112164 A1* | 4/2014 | Wigren | H04W 24/08 370/252 |
| 2014/0228043 A1* | 8/2014 | Wigren | H04W 72/1252 455/452.1 |
| 2014/0241176 A1* | 8/2014 | Wigren | H04L 5/0073 370/252 |
| 2014/0293802 A1* | 10/2014 | Wigren | H04W 24/08 370/252 |
| 2015/0124593 A1* | 5/2015 | Wigren | H04W 72/082 370/229 |
| 2015/0318944 A1* | 11/2015 | Wigren | H04W 52/40 370/230 |
| 2016/0007301 A1* | 1/2016 | Wigren | H04W 52/244 455/422.1 |

OTHER PUBLICATIONS

PCT Notification of Transmittal of the International Search Report and the Written Opinion of the International Searching Authority, or the Declaration for International application No. PCT/SE2012/051299, Nov. 18, 2013.

"Estimation of uplink WCDMA load in a single RBS" by Wigren et al., 2007.

"Low Complexity Kalman Filtering for Inter-Cell Interference and Power Based Load Estimation in the WCDMA Uplink" by Wigren, 2011.

"Recursive Noise Floor Estimation in WCDMA" by Wigren, 2010.

"Soft Uplink Load Estimation in WCDMA" by Wigren, Feb. 2009.

* cited by examiner

OTHER CELL INTERFERENCE ESTIMATION

PRIORITY

This nonprovisional application is a U.S. National Stage Filing under 35 U.S.C. §371 of International Patent Application Serial No. PCT/SE2012/051299, filed Nov. 23, 2012, and entitled "Other Cell Interference Estimation."

TECHNICAL FIELD

The technical field of the present disclosure generally relates to estimating other cell interferences in a wireless network. In particular, the technical field relates to apparatuses and methods for estimating other cell interferences using load utilization measurements.

BACKGROUND

Recently, at least the following trends have emerged in field of cellular telephony.

First, mobile broadband traffic has been exploding in wireless networks such as WCDMA (wideband code division multiple access). The technical consequence is a corresponding steep increase of the interference in these networks, or equivalently, a steep increase of the load. This makes it important to exploit the load headroom that is left in the most efficient way.

Second, cellular networks are becoming more heterogeneous, with macro RBSs (radio base station) being supported by micro and pico RBSs at traffic hot spots. Furthermore, home base stations (e.g., femto RBSs) are emerging in many networks. This trend puts increasing demands on intercell interference management.

Third, the consequence of the above is a large increase of the number of network nodes in cellular networks, together with a reduced operator control. There is therefore a strong desire to introduce more self-organizing network (SON) functionality. Such functionality may support interference management by automatic interference threshold setting and adaptation, for a subset of the nodes of the cellular network.

As a result, there are problems that can hinder providing efficient service. In WCDMA for example, the UEs (user equipments) may or may not utilize the power granted by the EUL (enhanced uplink) scheduler. This leads to an inaccuracy of the load prediction step, where the scheduler bases its scheduling decision on a prediction of the resulting air interface load of the traffic it schedules. This is so since the 3GPP (Third Generation Partnership Project) standard has an inherent delay of about at least 5 TTIs (transmission time intervals) from the scheduling decision until the interference power appears over the air interface. Also the WCDMA load prediction does not account for all imperfections in the modelling of an UL (uplink) radio receiver. This can lead to additional inaccuracies in the load prediction and estimation steps.

The inventors are not aware of any practical other cell interference estimation algorithm available that can provide other cell interference estimates with an inaccuracy better than 10-20%, and does so with close to transmission time interval (TTI, typically 2 ms (milliseconds) or 10 ms) bandwidth (typically 250 or 50 Hz) over interesting power and load ranges. As a result, it is not possible to make optimal scheduling decisions since the exact origin of the interference power in the UL is unknown.

Load Estimation without Other Cell Interference Estimation

Following is a discussion on measurement and estimation techniques to measure instantaneous total load on the uplink air interface given in a cell of a WCDMA system. In general, a load at the antenna connector is given by noise rise, also referred to as rise over thermal, RoT(t), defined by:

$$RoT(t) = \frac{P_{RTWP}(t)}{P_N(t)} \quad (1)$$

where $P_N(t)$ is the thermal noise level as measured at the antenna connector. For the purposes of discussion, $P_{RTWP}(t)$ may be viewed as the received total wideband power (RTWP) defined by:

$$P_{RTWP}(t) = \sum_{i=1}^{I} P_k(t) + P_{neighbor}(t) + P_N(t) \quad (2)$$

also measured at the antenna connector. The total wideband power $P_{RTWP}(t)$, is unaffected by any de-spreading applied. In (2), $P_{other}(t)$ represents the power as received from one or more cells of the WCDMA system other than an own cell, e.g. neighbouring cells. The $P_i(t)$ are the powers of the individual users, e.g. UEs, of the own cell. One major difficulty of any RoT estimation technique is in the inherent inability to separate the thermal noise $P_N(t)$ from the interference $P_{other}(t)$ from other cells.

Another specific problem that needs to be addressed is that the signal reference points are, by definition, at the antenna connectors. The measurements are however obtained after the analogue signal conditioning chain, in the digital receiver. The analogue signal conditioning chain introduces a scale factor error of about 1 dB (1-sigma) that is difficult to compensate for. Fortunately, all powers of (2) are equally affected by the scale factor error so when (1) is calculated, the scale factor error is cancelled as follows:

$$RoT^{DigitalReceiver}(t) = \frac{P_{RTWP}^{DigitalReceiver}(t)}{P_N^{DigitalReceiver}(t)} = \frac{\gamma(t) P_{RTWP}^{Antenna}(t)}{\gamma(t) P_N^{Antenna}(t)} = RoT^{Antenna}(t) \quad (3)$$

To understand the fundamental problem of interferences from other cells when performing load estimation, note that:

$$P_{neighbor}(t) + P_N(t) = E[P_{neighbor}(t)] + E[P_N(t)] + \Delta P_{neighbor}(t) + \Delta P_N(t) \quad (4)$$

where E[ ] denotes a mathematical expectation and where Δ denotes a variation around the mean. The fundamental problem can now be clearly seen. Since there are no measurements available in the RBS that are related to the other cell interference, a linear filtering operation can at best estimate the sum $E[P_{other}(t)] + E[P_N(t)]$. This estimate cannot be used to deduce the value of $E[P_N(t)]$. The situation is the same as when the sum of two numbers is available. Then there is no way to figure out the individual values of $E[P_{other}(t)]$ and $E[P_N(t)]$. It has also been formally proved that the thermal noise power floor is not mathematically observable in case there is a non-zero mean other cell interference present in the uplink (UL).

FIG. 1 illustrates a conventional algorithm that estimates a noise floor. The illustrated algorithm is referred to as a sliding window algorithm, and estimates the RoT as given by equation (1). The main problem solved by this conventional estimation algorithm is that it can provide an accurate estimation of the thermal noise floor N(t). Since it is not possible to obtain exact estimates of this quantity due to the other cell interference, the estimator therefore applies an approximation, by consideration of a soft minimum as computed over a relative long window in time. It is important to understand that this estimation relies on the fact that the noise floor is constant over very long periods of time (disregarding the small temperature drift).

One significant disadvantage of the sliding window algorithm is that the algorithm requires a large amount of storage memory. This becomes particularly troublesome in case a large number of instances of the algorithm is needed, as may be the case when base stations serve many cells and when techniques like 4-way receiver diversity is introduced in the WCDMA uplink. A recursive algorithm has been introduced to reduce the memory consumption. Relative to the sliding window algorithm, the recursive algorithm can reduce the memory requirement by a factor of more than one hundred.
Load Prediction without Other Cell Interference Estimation Following is a discussion on techniques to predict instantaneous load on the uplink air interface ahead in time. The scheduler uses this functionality. The scheduler tests different combinations of grants to determine the best combinations, e.g., maximizing the throughput. This scheduling decision will only affects the air interface load after a number of TTIs (each such TTI is a predetermined time duration such as 2 or 10 ms), due to grant transmission latency and UE latency before the new grant takes effect over the air interface.

In a conventional SIR (signal-to-interference ratio) based method, the prediction of uplink load, for a tentative scheduled set of UEs and grants, is based on the power relation defined by:

$$P_{RTWP}(t) - P_N(t) = \sum_{i=1}^{N} L_i(t) P_{RTWP}(t) + P_{neighbor}(t) \quad (5)$$

where $L_i(t)$ is the load factor of the i-th UE of the own cell. As indicated, $P_{other}(t)$ denotes the other cell interference. The load factors of the own cell are computed as follows. First, note that:

$$(C/I)_i(t) = \frac{P_i(t)}{P_{RTWP}(t) - (1-\alpha)P_i} = \quad (6)$$

$$\frac{L_i(t) P_{RTWP}(t)}{P_{RTWP}(t) - (1-\alpha) L_i(t) P_{RTWP}(t)} = \frac{L_i(t)}{1-(1-\alpha)L_i(t)}$$

$$\Leftrightarrow$$

$$L_i(t) = \frac{(C/I)_i(t)}{1+(1-\alpha)(C/I)_i(t)}, \quad i = 1, \ldots, I$$

where I is the number of UEs in the own cell and $\alpha$ is the self-interference factor. The carrier to interference values, $(C/I)_i(t)$, i=1, . . . , I, are then related to the SINR (measured on the DPCCH channel (Downlink Physical Control Channel)) as follows:

$$(C/I)_i(t) = \quad (7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right),$$

$$i = 1, \ldots, I$$

In (7), $W_i$ represents the spreading factor, RxLoss represents the missed receiver energy, G represents the diversity gain and the $\beta$:s represent the beta factors of the respective channels. Here, inactive channels are assumed to have zero data beta factors. The beta factors hence represent the data power offset of the specific transmission.

The UL load prediction then computes the uplink load of the own cell by a calculation of (6) and (7) for each UE of the own cell, followed by a summation:

$$L_{own}(t) = \sum_{i=1}^{I} L_i(t), \quad (8)$$

which transforms (5) to:

$$P_{RTWP}(t) = L_{own}(t) P_{RTWP}(t) + P_{neighbor}(t) + P_N(t). \quad (9)$$

Dividing (9) by $P_N(t)$ shows that the RoT can be predicted k TTIs ahead as:

$$RoT(t + kT) = \frac{P_{neighbor}(t)/P_N(t)}{1 - L_{own}(t)} + \frac{1}{1 - L_{own}(t)} \quad (10)$$

In the SIR based load factor calculation, the load factor $L_i(t)$ is defined by (6). However, in a power based load factor calculation, the load factor $L_i(t)$ can be defined by:

$$L_i(t) = \frac{P_i(t)}{P_{RTWP}(t)} \quad (11)$$

and equations (8)-(10) may be calculated based on the load factor $L_i(t)$ of (11) to predict the RoT k TTIs ahead. An advantage of the power based load factor calculation is that the parameter dependency is reduced. But on the downside, a measurement of the UE power is needed.

In heterogeneous networks (HetNets), different kinds of cells are mixed. A problem that arises in HetNets in that the cells are likely to have different radio properties in terms of (among others):
radio sensitivity;
frequency band;
coverage;
output power;
capacity; and
acceptable load level.

This can be an effect of the use of different RBS sizes (macro, micro, pico, femto), different revisions (different receiver technology, SW (software) quality), different vendors, the purpose of a specific deployment, and so on. An important factor in HetNets is that of the air interface load management, i.e., the issues associated with the scheduling of radio resources in different cells and the interaction between cells in terms of inter-cell interference.

These issues are exemplified with reference to FIG. 2 which illustrates a low power cell with limited coverage intended to serve a hotspot. To enable sufficient coverage of the hot spot, an interference suppressing receiver like the G-rake+ is used. One problem is now that the low power cell is located in the interior of and at the boundary of a specific macro cell. Also, surrounding macro cells interfere with the low power cell rendering a high level of other cell interference in the low power cell which, despite the advanced receiver, reduces the coverage to levels that do not allow coverage of the hot spot. As a result, UEs of the hot spot are connected to the surrounding macro cells, which can further increase the other cell interference experienced by the low power cell.

SUMMARY

It is an objective of the present disclosure to improve the other cell interference estimation in a radio network node corresponding to a cell of interest in a wireless network.

According to an aspect of the present disclosure, there is provided a method for estimating other cell interference in a radio network node providing an own cell serving at least one radio device in a radio network. The method comprises measuring a load utilization, relating to the load utilized by said at least one radio device. The method also comprises estimating a load utilization probability based at least on the measured load utilization, a previously estimated load utilization probability and a previously estimated interference-and-noise sum. The method also comprises estimating an interference-and-noise sum based at least on the measured load utilization, a measured received total wideband power (RTWP) the estimated load utilization probability and the previously estimated interference-and-noise sum. The method also comprises checking whether the estimated load utilization probability and/or estimated interference-and-noise sum and/or any algorithm value derived from any of the estimates, is within a predefined range. Embodiments of the method also comprises an estimation of the thermal noise part of the RTWP, and a subtraction of the thermal noise estimate from the interference-and-noise sum estimate, to obtain an estimated other cell interference.

According to another aspect of the present disclosure, there is provided a radio network node configured for providing an own cell serving at least one radio device in a radio network. The node comprises a transmitter and a receiver for communication with said at least one radio device over a radio interface. The node also comprises a processor, and a storage unit storing instructions that, when executed by the processor, cause the node to measure a load utilization, relating to the load utilized by the at least one radio device. The instructions also cause the node to estimate a load utilization probability based at least on the measured load utilization, a previously estimated load utilization probability and a previously estimated interference-and-noise sum. The instructions also cause the node to estimate an interference-and-noise sum based at least on the measured load utilization, a measured received total wideband power (RTWP) the estimated load utilization probability and the previously estimated interference-and-noise sum. The instructions also cause the node to check whether the estimated load utilization probability and/or estimated interference-and-noise sum and/or any algorithm value derived from any of the estimates, is within a predefined range. In some embodiments, the instructions also cause the node to estimate a thermal noise part of the RTWP, and subtract the thermal noise estimate from the interference-and-noise sum estimate, to obtain an estimated other cell interference.

According to another aspect of the present disclosure, there is provided a radio network node configured for providing an own cell serving at least one radio device in a radio network. The node comprises means for measuring a load utilization, relating to the load utilized by said at least one radio device. The node also comprises means for estimating a load utilization probability based at least on the measured load utilization, a previously estimated load utilization probability and a previously estimated interference-and-noise sum. The node also comprises means for estimating an interference-and-noise sum based at least on the measured load utilization, a measured received total wideband power (RTWP) the estimated load utilization probability and the previously estimated interference-and-noise sum. The node also comprises means for checking whether the estimated load utilization probability and/or estimated interference-and-noise sum and/or any algorithm value derived from any of the estimates, is within a predefined range. In some embodiments, the node also comprises means for estimating a thermal noise part of the RTWP, and subtracting the thermal noise estimate from the interference-and-noise sum estimate, to obtain an estimated other cell interference.

According to another aspect of the present disclosure, there is provided a radio network node configured for providing an own cell serving at least one radio device in a radio network. The node comprises measurement circuitry configured for measuring a load utilization, relating to the load utilized by said at least one radio device. The node also comprises processing circuitry configured for estimating a load utilization probability based at least on the measured load utilization, a previously estimated load utilization probability and a previously estimated interference-and-noise sum. The node also comprises processing circuitry configured for estimating an interference-and-noise sum based at least on the measured load utilization, a measured received total wideband power (RTWP) the estimated load utilization probability and the previously estimated interference-and-noise sum. The node also comprises processing circuitry configured for checking whether the estimated load utilization probability and/or estimated interference-and-noise sum and/or any algorithm value derived from any of the estimates, is within a predefined range. In some embodiments, the node also comprises processing circuitry configured for estimating a thermal noise part of the RTWP, and subtracting the thermal noise estimate from the interference-and-noise sum estimate, to obtain an estimated other cell interference.

The processing circuitries of the above aspect may e.g. be comprised in one, or several, processing unit/processor of the radio device.

Any of the radio network node aspects above may e.g. be used to perform an embodiment of the method aspect above of the present disclosure.

According to another aspect of the present disclosure, there is provided a computer program product comprising computer-executable components for causing a radio network node to perform an embodiment of the method of the present disclosure when the computer-executable components are run on a processor comprised in the node.

According to another aspect of the present disclosure, there is provided a computer program for estimating other cell interference in a radio network node providing an own cell serving at least one radio device in a radio network. The computer program comprises computer program code which is able to, when run on a processor of the radio network node, cause the node to measure a load utilization, relating to the load utilized by said at least one radio device. The code is also able to cause the node to estimate a load utilization probability based at least on the measured load utilization, a previously estimated load utilization probability and a previously estimated interference-and-noise sum. The code is also able to cause the node to estimate the interference-and-noise sum based at least on the measured load utilization, a measured received total wideband power (RTWP) the estimated load utilization probability and the previously estimated interference-and-noise sum. The code is also able to cause the node to check whether the estimated load utilization probability and/or estimated interference-and-noise sum and/or any algorithm value derived from any of the estimates, is within a predefined range. In some embodiments the code is also able to cause the node to estimate a thermal noise part of the RTWP, and subtract the thermal noise estimate from the interference-and-noise sum estimate, to obtain an estimated other cell interference.

It is advantageous to, in accordance with the present disclosure, estimate the interference of other, e.g. neighbouring, cell(s) based on the load utilized by the radio device or plurality of radio devices served by the network node (the own cell), and not on the scheduled load since not all the scheduled load may be utilized. In this way, a better other cell interference estimate can be obtained and the scheduling and uplink powers may be better optimized. The algorithm for computing the estimated other cell interference based on the estimated load utilization may crash or run away uncontrollably for certain estimated values, depending on the design of the algorithm, e.g. due to a division by zero. To avoid this, a check is performed to make sure that a value of the algorithm, e.g. a start value or a value further down the line of the algorithm, is within a predefined value range, thereby securing that the algorithm does not crash or does otherwise not behave well.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

Figure 1:
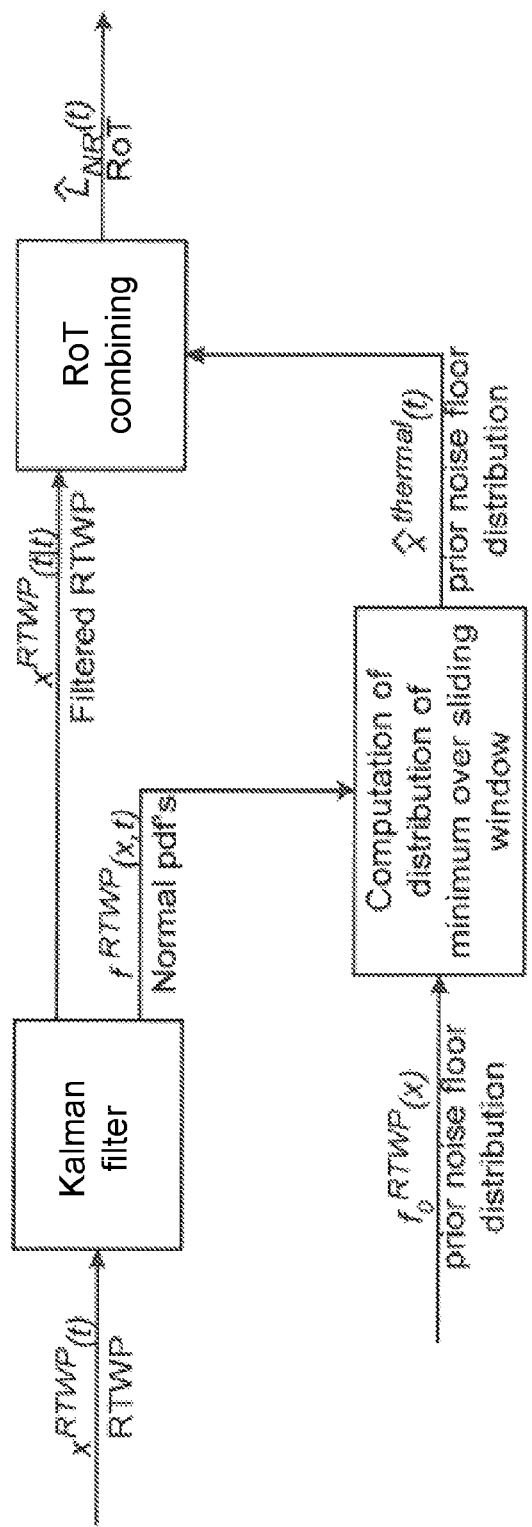
FIG. 1 is a schematic flow chart of an algorithm which estimates a noise floor, according to prior art.
Figure 2:
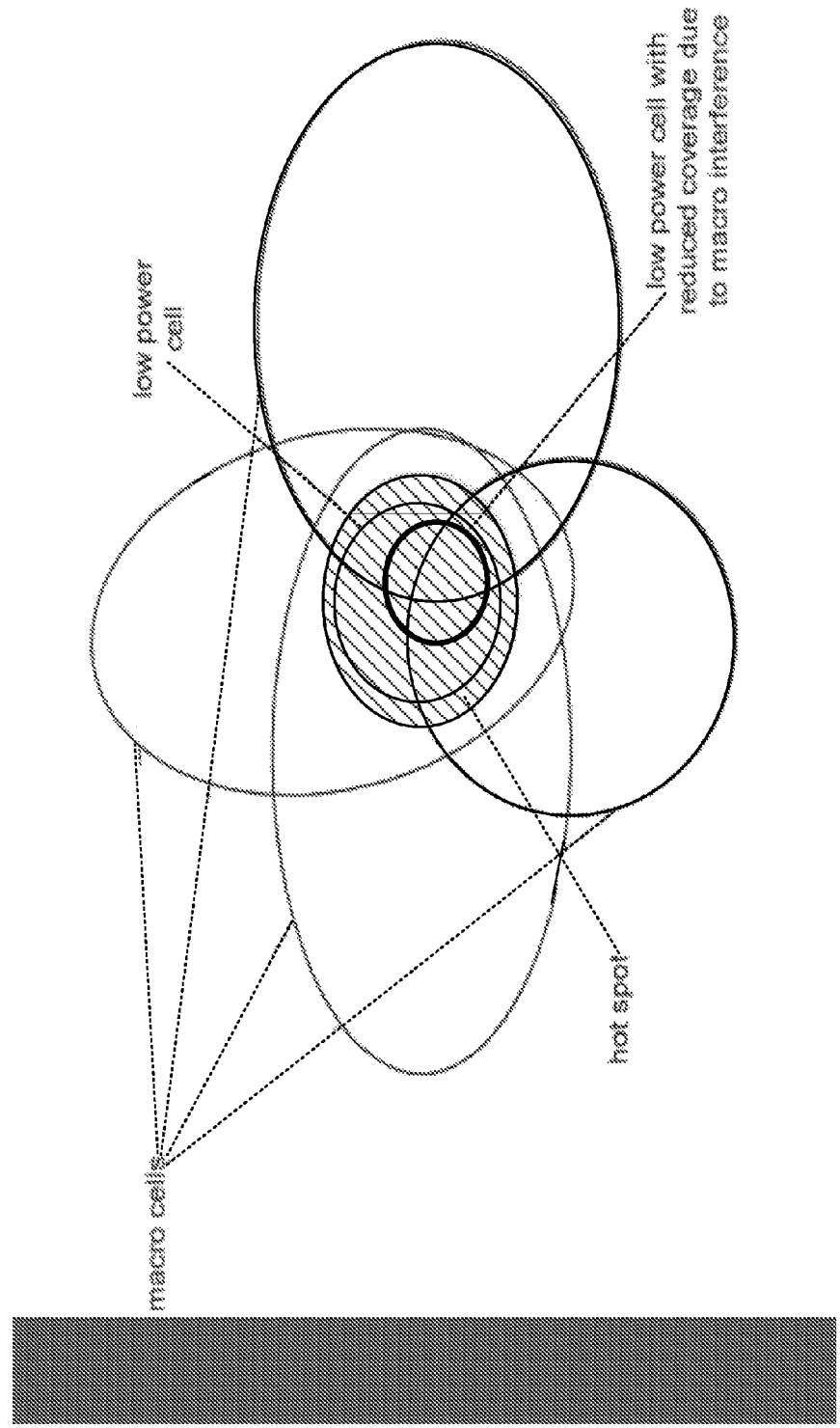
FIG. 2 illustrates a low power cell with limited coverage intended to serve a hotspot, according to prior art.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Functions of various elements including functional blocks labelled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiMAX, cdma2000, 1×EVDO, etc. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a radio network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

As indicated above, one major disadvantage of many conventional RoT(t) estimation techniques is in the difficulty in separating the thermal noise $P_N(t)$ from the interference $P_{other}(t)$ from other cells. This makes it difficult to estimate the RoT(t), i.e., difficult to estimate the load as given in equation (1). The other cell interference $P_{other}(t)$ in this context may be viewed as a sum of interferences present in a cell of interest due to wireless activities applicable at time t in one or more cells other than in the cell of interest. In one or more aspects, the determination of the other cell interference $P_{other}(t)$ involves estimating the other cell interference. For the purposes of this disclosure, estimations of parameters are indicated with a "^" (caret) character. For example, $\hat{P}_{other}(t)$ may be read as an estimate of the other cell interference $P_{other}(t)$.

There are known techniques to determine the other cell interference estimate $\hat{P}_{other}(t)$. These conventional techniques assume that the powers of all radio links are measured in the uplink receiver. This assumption is not true in many instances today. The power measurement is associated with difficulties since:

In WCDMA for example, the uplink transmission is not necessarily orthogonal, which can cause errors when the powers are estimated; and The individual code powers are often small, making the SNRs (signal-to noise ratio) low as well. This further contributes to the inaccuracy of the power estimates.

One major problem associated with the conventional other cell interference estimation techniques is that the sum of other cell interference and thermal noise $P_{other}(t)+P_N(t)$ (referred to as the interference-and-noise sum) needs to be estimated through high order Kalman filtering. The primary reason is that all powers of the UEs need to be separately filtered using at least one Kalman filter state per UE when such techniques are used. This step therefore is associated with a very high computational complexity. There are techniques that can reduce this computational complexity, but the complexity can be still too high when the number of UEs increases. In these conventional solutions, the thermal noise floor $N(t)$ is estimated as described above, i.e., $\hat{N}(t)$ is determined followed by a subtraction to arrive at an estimate of the other cell interference $\hat{P}_{other}(t)$.

In the existing solutions, the EUL utilizes a scheduler that aims to fill the load headroom of the air interface, so that the different UE requests for bitrates are met. As stated above, the air-interface load in WCDMA is determined in terms of the noise rise over the thermal power level, i.e., the $RoT(t)$, which is estimated at the base station.

When evaluating scheduling decisions, the scheduler predicts the load that results form the scheduled grants, to make sure that the scheduled load does not exceed the load thresholds for coverage and stability. This can be complicated since the grant given to a UE only expresses a limit on the UL power the UE is allowed to use. However, the UE may actually use only a portion of its grant. The conventional scheduler makes a worst case analysis, assuming that all UEs will use their grants at all times. But in reality, UEs in general have a relatively low utilization of grants. According to some measurements a significant amount (about 75%) of air-interface resources is wasted.

To summarize, the lack of technology for estimation of the load utilization probability and its variance can have at least the following disadvantages:

Can lead to an underutilization of the air interface, due to the fact that UEs often do not use all the power granted to them;

Can prevent the use of systematic statistical overbooking of grants, since a statistical model of load utilization is not available. In particular, a statistical model of variance in the load utilization is not available; and Can lead to a general inaccuracy of the load prediction, since unmodelled receiver impairments are not captured correctly by a load utilization probability estimate.

Regarding HetNets in particular, problems associated with conventional scheduling techniques can be explained in a relatively straightforward manner. For scheduling in the base station in general, prior techniques require measurement of all UE powers in the UL. This is very costly computationally, requiring Kalman filters of high order for processing the measurements to obtain estimates of the other cell interference power. This is because each own cell UE adds a state to the Kalman filter. The consequence, if such estimation cannot be done, is that the scheduler is unaware of the origin of the interference, thereby making it more difficult to arrive at good scheduling decisions. For HetNets, the problem is again that there is no information of the origin of interference, and interference variance, for adjacent cells. This is primarily due to the lack of low complexity estimators for these quantities.

Each of one or more aspects of the disclosed subject matter addresses one or more of the issues related to conventional techniques. For example, recall from above that in conventional scheduling techniques, there is a delay of some number of TTIs from the scheduling decision until the interference power appears over the air interface. The scheduler also bases its scheduling decisions on a prediction of the load of the traffic it schedules. Since the UEs do not always utilize power granted by the scheduler, the load prediction are likely to be inaccurate. The inaccuracy tends to increase as the delay increases. To address this issue, in one or more aspects of the disclosed subject matter, measurements of momentary load utilization may be made and accounted for in the estimation of other cell interferences.

As another example, also recall that load prediction does not account for all imperfections in the modelling of the UL receiver. To address this issue, in one or more aspects of the disclosed subject matter, load factor bias may be estimated, e.g., when other cell interference is estimated.

A general concept applicable to one or more aspects includes a UL nonlinear interference model and an estimator. The UL nonlinear interference can be responsive to:

a scheduled own cell load factor $L_{own}(t)$, an estimated load utilization probability $\hat{p}_{load}(t)$ (note the lower case "p"), an estimated sum of other cell interference and thermal noises $\hat{P}_{other}(t)+\hat{P}_N(t)$ (note the upper case "P"), and (optionally) an estimated load factor bias $\Delta \hat{L}_{own}(t)$, these quantities expressing an UL load curve relationship; or an estimated own cell load factor $\hat{L}_{own}(t)$, an estimated sum of other cell interference and thermal noise $\hat{P}_{other}(t)+\hat{P}_N(t)$, and (optionally) an estimated load factor bias $\Delta \hat{L}_{own}(t)$, these quantities expressing an UL load curve relationship.

The estimator can be responsive to:

a measured total wideband power $y_{RTWP}(t)$, a measured load utilization probability $p_{load}(t)$, a received uplink own cell load factor $L_{own}(t)$, and the UL nonlinear interference model; or a measured total wideband power $y_{RTWP}(t)$, a measured own cell load factor $L_{own}(t)$, and the UL nonlinear interference model.

The estimator can also be responsive to a dynamic model for propagation of the estimated states. The estimated states can include:

the estimated sum of other cell interference and thermal noise $\hat{P}_{other}(t)+\hat{P}_N(t)$, the estimated load utilization probability $\hat{p}_{load}(t)$, (optionally) the estimated load factor bias $\Delta \hat{L}_{own}(t)$ and at least one delay line state; or the estimated sum of other cell interference and thermal noise $\hat{P}_{other}(t)+\hat{P}_N(t)$, the estimated own cell load factor $L_{own}(t)$, (optionally) the estimated load factor bias $\Delta \hat{L}_{own}(t)$ and at least one delay line state.

The estimator can further be responsive to an estimated thermal noise $\hat{P}_N(t)$, and provide an estimated other cell interference $\hat{P}_{other}(t)$. For example, the other cell interference estimate $\hat{P}_{other}(t)$ may be arrived at by subtracting the thermal noise estimate $\hat{P}_N(t)$ from the interference-and-noise sum estimate $\hat{P}_{other}(t)+\hat{P}_N(t)$.

In the discussion above, the values of parameters are "estimated", "measured", "received" or "computed". A measured value in essence can be viewed a number that expresses a value of a measured quantity. An estimated value is not a number that expresses a value of a measurement, at least not directly. Rather, an estimate can be viewed as a processed set of measurements, e.g., by some filtering operation. There can also be received and/or computed quantities, such as time varying parameters that are obtained from other sources. It is stressed that measured or estimated quantities can be very different, also in case the measured and estimated quantity refer to the same underlying physical quantity, e.g., a specific power. One among many reasons for this is that the processing to obtain estimates e.g., may combine measurements from different times to achieve e.g., noise suppression and bias reduction.

As will be demonstrated below, one very significant advantage of the inventive estimator is its low order and associated low computational complexity. In one embodiment, the estimator can be a variant of an extended Kalman filter (EKF), arranged for processing using the nonlinear interference model.

One or more of the inventive aspects can be applied to both the sliding window and recursive RoT estimation algorithms. Either SIR or power based load factor calculation may be used. The power based calculation is preferred however.

Recall from the discussion regarding HetNets that the surrounding macro cells can interfere with the low power cell to levels such that the UEs of the hotspot are actually connected to the macro cells. To address such issues, in one or more aspects of disclosed subject matter, RNC (radio network controller) or the surrounding RBSs can be informed of the interference situation and can take action as appropriate. For example, admission control in the RNC or functionalities in the surrounding RBSs can be used to reduce the other cell interference and provide better management of the hot spot traffic, e.g., in terms of air interface load. To enable this to take place, the RBS can include capabilities to estimate the other cell interference.

In an example scenario in which a radio network node (e.g., eNB, eNode B, Node B, base station (BS), radio base station (RBS), and so on) can estimate the other cell interference. In the example, the radio network node serves one or more wireless terminals (e.g., user equipment, mobile terminal, laptops, M2M (machine-to-machine) terminals, etc.) located within a corresponding cell. For clarity, the radio network node will be referred to as an own radio network node, the cell will be referred to as the cell of interest, and the terminals within the cell of interest will be referred to as own terminals. The scenario in the example also includes other radio network nodes serving other wireless terminals. When the other terminals transmit to their respective other radio network nodes, these signals are also received in the own radio network node. Such signals act as interferers within the cell of interest. A sum of powers of these interfering signals experienced at the own radio network node at time t will be denoted as $P_{other}(t)$. In other words, the other cell interference $P_{other}(t)$ may be viewed as expressing a sum of interferences present in the cell of interest due to wireless activities applicable at time t in one or more cells other than in the cell of interest. Further, there is the thermal noise $P_N(t)$ experienced in the own radio network node of the cell of interest at time t.

In one or more examples, the radio network node can be structured to implement a high performing estimator. The estimator can perform a joint estimation of $P_{other}(t)+P_N(t)$, $P_N(t)$, $P_{other}(t)$ (note the upper case "P") and the load utilization probability $p_{load}(t)$ (note the lower case "p"). An extended Kalman filter (EKF) can be used in one or more embodiments of the proposed estimator.

The proposed estimator can use any one or more of the following information:

Measurements of $P_{RTWP}(t)$, with a sampling rate of $T_{RTWP}=k_{RTWP}TTI$, $k_{RTWP}\in Z+$. Preferably, the measurements are available for each antenna branch.

Computed load factors $L_{own}(t)$, with a sampling rate of $T_L=k_L TTI$, $k_L\in Z+$. Preferably, load factors are available per cell and are valid on cell level. They need not necessarily be valid on antenna branch level with Rx diversity.

The loop delay $T_D$ between the calculation of $L_{own}(t)$, and the time it takes effect on the air interface. The loop delay may be dependent on the TTI. Preferably, the loop delay is available for and valid per cell.

Measured load factors $\overline{L}_{own}(t)$, with a sampling rate of $T_{\overline{L}}=k_{\overline{L}}TTI$, $k_{\overline{L}}\in Z+$. Preferably, the load factors are available per cell, and valid on the cell level. They need not necessarily be valid on the antenna branch level with Rx diversity. The factors can be obtained after TFCI decoding.

The loop delay $\overline{T}_D$ between the calculation of $\overline{L}_{own}(t)$, and the time it takes effect on the air interface. The loop delay can be dependent on the TTI and larger than $T_D$ since the measured load factor calculation may necessitate TFCI and E-TFCI decoding.

For adaptation to extended Kalman filtering, the following states are modeled:

$$x_1(t)=p_{load}(t)-\text{load utilization probability at time }t, \quad (12)$$

$$x_2(t)=P_{other}(t)+P_N(t)-\text{interference-and-noise sum at time }t, \quad (13)$$

$$x_3(t)=\Delta \overline{L}_{own}(t)-\text{load factor bias at time }t, \quad (14)$$

$$x_4(t)=x_1(t-T)-\text{decoding delay incorporated.} \quad (15)$$

Modelling in one aspect may be viewed as a form of state space modelling in which state space of a physical system is mathematically modelled as a set of input, output and state variables related by equations.

Since an additional decoding delay affects the loop, the first state $x_1(t)$ should be delayed by an extra state to define the fact that the load utilization probability measurement is subject to an additional delay T for decoding. The fourth state $x_4(t)$ can be used for this purpose. The delay T can any positive integer multiple of the TTI. Typically the delay T is substantially equal to one TTI. In the equations for the states, $\Delta L_{own}(t)$ represents a slowly varying load factor bias error in the measurement model.

If alternative "b" is used, then the estimated own cell load factor $L_{own}(t)$ may be introduced as the first state $x_1(t)$.

In the inventive nonlinear model, various measurements can be made available for processing. First of these is the total wideband power $P_{RTWP}(t)$. Note that the scheduled load of the own cell $L_{own}(t)$ is a computed quantity (e.g., based on SINR measurements). For this reason, it is advantageous to provide a measurement model of $P_{RTWP}(t)$, expressed in terms of the states, computed quantities and a measurement uncertainty. Towards this end, first note that the load in equation (6) does not account for the load utilization probability $p_{load}(t)$. Also, it does not account for the delay $T_D$.

To model the load utilization effect, and to compensate for semi-constant load factor errors, a review of equation (5) suggests that load underutilization can be modeled by a modification of (5) and (6) as:

$$L_{own,utilized}(t) = \qquad (16)$$

$$\sum_{i=1}^{I} p_{load}(t)L_i(t-T_D) + \Delta \overline{L}_{own}(t) = p_{load}(t)L_{own}(t-T_D) + \Delta \overline{L}_{own}(t),$$

$$P_{RTWP}(t) = L_{own,utilized}(t)P_{RTWP}(t) + P_{other}(t) + P_N(t) \qquad (17)$$

$$P_{RTWP}(t) = \frac{1}{1 - L_{own}(t-T_D)p_{load}(t) + \Delta \overline{L}_{own}(t)}(P_{other}(t) + P_N(t)). \qquad (18)$$

After an addition of a zero mean white measurement noise $e_{RTWP}(t)$ and replacement of variables by the states of (12)-(15), the following nonlinear measurement equations result:

$$y_{RTWP}(t) = \frac{x_2(t)}{1 - L_{own}(t-T_D)x_1(t) + x_3(t)} + e_{RTWP}(t), \qquad (19)$$

$$R_{2,RTWP}(t) = E[e_{RTWP}^2(t)]. \qquad (20)$$

In (19) and (20), $y_{RTWP}(t)=P_{RTWP}(t)$ and $R_{2,RTWP}(t)$ denotes the (scalar) covariance matrix of $e_{RTWP}(t)$. If the load of the own cell is computed using both EUL and R99 traffic, the delay can be valid for both. If the own cell load is estimated instead, $L_{own}(t-T_D)x_1(t)$ can be expressed by a state directly modeling the estimated load factor of the own cell. The own cell load factor appearing in (19) can be treated as a known time varying factor, not as an estimate.

Note that (19) can represents a nonlinear load curve, expressed in terms of the estimated load utilization probability ($x_1(t)$), the estimated sum of neighbor cell interference and thermal noise power ($x_2(t)$) and the estimated load factor bias ($x_3(t)$). That is, (19) can represent a nonlinear curve expressed in terms of $\hat{x}_1(t)$, $\hat{x}_2(t)$ and $\hat{x}_3(t)$. Further the computed ("received") load factor can be used in the nonlinear load curve. Equation (19) can be said to relate the momentary combined effect of the estimated quantities and received quantities to the left hand side of the equation, i.e. the momentary measurement of the wideband power. Note that in one or more embodiments, the thermal noise floor $N(t)$ can be used to represent the thermal noise $P_N(t)$ and the thermal noise floor estimate $\hat{N}(t)$ can be used to represent thermal noise estimate $\hat{P}_N(t)$ in these equations.

Measurement of the load utilization probability $p_{load}(t)$ can be made available per cell. As an example, the decoded TFCIs and E-TFCISs show which grants the wireless terminal 430 actually used in the last TTI. This provides the information needed to compute the actual load factor of the last TTI, i.e. to compute:

$$p_{load}(t) = \frac{\overline{L}_{own}(t-T_D)}{L_{own}(t-T_D)}. \qquad (21)$$

With such modification, the measurement model for the load utilization probability measurement becomes:

$$y_{loadUtilization}(t)=x_4(t)+e_{loadUtilization}(t), \qquad (22)$$

$$R_{2,loadUtilization}(t)=E[e_{loadUtilization}(t)]^2. \qquad (23)$$

The transformation (21) can be view as essentially replacing the granted load factor, $L_{own}(t-T_D)$, with the load factor computed based on the received TFCIs and E-TFCIs.

In the dynamic state model, random walk models can be adapted for the first and second state variables $x_1(t)$ and $x_2(t)$. In order to avoid a drifting bias correction of the load factor, an autoregressive model can be used for the third state $x_3(t)$. A further motivation for this is that the state can be expected to model errors that over an ensemble has a zero mean. Hence the following state model can result from the states of (12)-(15).

$$x(t+T_{TTI}) \equiv \begin{pmatrix} x_1(t+T) \\ x_2(t+T) \\ x_3(t+T) \\ x_4(t+T) \end{pmatrix} = \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix} \qquad (24)$$

$$R_1(t) = E\left[\begin{pmatrix} w_1(t) \\ w_2(t) \\ w_3(t) \\ w_4(t) \end{pmatrix} \begin{pmatrix} w_1(t) & w_2(t) & w_4(t) & w_4(t) \end{pmatrix}\right]. \qquad (25)$$

Preferably, the delay T equals one TTI, but can be any positive integer multiple of the TTI. Note that by setting a=1, a random walk model can be obtained for all states. A diagonal covariance matrix can be used. The last component of the system noise is preferably selected to be very small, reflecting the pure delay it is intended to model.

A general state space model behind the EKF can be expressed as follows:

$$x(t+T)=A(t)x(t)+B(t)u(t)+w(t). \qquad (26)$$

$$y(t)=c(x(t))+e(t). \qquad (27)$$

Here x(t) denotes a state vector, u(t) denotes an input vector (not used in the inventive filtering), y(t) denotes an output measurement vector comprising power measurements performed in a cell (i.e., the total received wideband power $P_{RTWP}(t)$), w(t) denotes the so called systems noise that represent the model error, and e(t) denotes the measurement error. The matrix A(t) is a system matrix describing the dynamic modes, the matrix B(t) is the input gain matrix, and the vector c(x(t)) is the, possibly nonlinear, measurement vector which is a function of the states of the system. Finally, t represents the time and T represents the sampling period.

The general case with a nonlinear measurement vector is considered here. For this reason, the extended Kalman filter should be applied. This filter is given by the following matrix and vector iterations Initialization:

Initialization: (28)

$t = t_0$ $\hat{x}(0 \mid -1) = x_0$ $P(0 \mid -1) = P_0$

Iteration $t = t + T$ $C(t) = \left.\frac{\partial c(x)}{\partial x}\right|_{x=\hat{x}(t\mid t-T)}$ $\hat{x}(t \mid t) = \hat{x}(t \mid t-T) + K_f(t)(y(t) - c(\hat{x}(t \mid t-T)))$ $P(t \mid t) = P(t \mid t-T) - K_f(t)C(t)P(t \mid t-T)$ $\hat{x}(t+T \mid t) = A\hat{x}(t \mid t) + Bu(t)$ $P(t+T \mid t) = AP(t \mid t)A^T + R_1$.

End.

The quantities introduced in the filter iterations (28) are different types of estimates ($\hat{x}(t|t-T)$, $\hat{x}(t|t)$, $P(t|t-T)$, and $P(t|t)$), function of such estimates ($C(t)$ and $K_f(t)$), or other quantities ($R_2(t)$ and $R_1(t)$), defined as follows:

$\hat{x}(t|t-T)$ denotes a state prediction, based on data up to time $t-T$, $\hat{x}(t|t)$ denotes a filter update, based on data up to time t, $P(t|t-T)$ denotes a covariance matrix of the state prediction, based on data up to time $t-T$, $P(t|t)$ denotes a covariance matrix of the filter update, based on data up to time t, $C(t)$ denotes a linearized measurement matrix (linearization around the most current state prediction), $K_f(t)$ denotes a time variable Kalman gain matrix, $R_2(t)$ denotes a measurement covariance matrix, and $R_1(t)$ denotes a system noise covariance matrix.

Note that $R_1(t)$ and $R_2(t)$ are often used as tuning variables of the filter. In principle, the bandwidth of the filter can be controlled by the matrix quotient of $R_1(t)$ and $R_2(t)$.

An example of an inventive estimation scheme using EKF will be described. The quantities of the EKF for estimation of the other cell interference and the load utilization load factor bias can now be defined. Using (19)-(20) and (22)-(25) and (28) it follows that:

$$C(t) = \begin{pmatrix} C_{11}(t) & C_{12}(t) & C_{13}(t) & 0 \\ 0 & 0 & 0 & C_{24}(t) \end{pmatrix} \tag{29}$$

$$C_{11}(t) = \frac{L_{own}(t-T_D)\hat{x}_2(t|t-T)}{(1-L_{own}(t-T_D)\hat{x}_1(t|t-T) + \hat{x}_3(t|t-T))^2} \tag{30}$$

$$C_{12}(t) = \frac{1}{1-L_{own}(t-T_D)\hat{x}_1(t|t-T) + \hat{x}_3(t|t-T)} \tag{31}$$

$$C_{13}(t) = -\frac{\hat{x}_2(t|t-T)}{(1-L_{own}(t-T_D)\hat{x}_1(t|t-T) + \hat{x}_3(t|t-T))^2} \tag{32}$$

$$C_{24}(t) = 1 \tag{33}$$

$$R_2(t) = E\left[\begin{pmatrix} e_{RTWP}(t) \\ e_{loadUtilization}(t) \end{pmatrix} \begin{pmatrix} e_{RTWP}(t) & e_{loadedUtilization}(t) \end{pmatrix}\right] \tag{34}$$

$$= \begin{pmatrix} R_{2,11}(t) & R_{2,12}(t) \\ R_{2,12}(t) & R_{2,22}(t) \end{pmatrix}$$

$$c(\hat{x}(t|t-T_{TTI})) = \begin{pmatrix} \frac{\hat{x}_2(t|t-T)}{1-L_{own}(t-T_D)\hat{x}_1(t|t-T) + \hat{x}_3(t|t-T)} \\ \hat{x}_4(tt-T) \end{pmatrix} \tag{35}$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \tag{36}$$

$$B = 0 \tag{37}$$

$$R_1(t) = E\left[\begin{pmatrix} w_1(t) \\ w_2(t) \\ w_3(t) \\ w_4(t) \end{pmatrix} \begin{pmatrix} w_1(t) & w_2(t) & w_3(t) & w_4(t) \end{pmatrix}\right] \tag{38}$$

$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}.$$

In order to execute the EKF, the state prediction and the state covariance prediction at time t are needed, they are given by the following equations:

$$\hat{x}(t|t-T_{TTI}) \equiv \begin{pmatrix} \hat{x}_1(t|t-T) \\ \hat{x}_2(t|t-T) \\ \hat{x}_3(t|t-T) \\ \hat{x}_4(t|t-T) \end{pmatrix} \tag{39}$$

$$P(t|t-T_{TTI}) = \tag{40}$$

$$\begin{pmatrix} P_{11}(t|t-T) & P_{12}(t|t-T) & P_{13}(t|t-T) & P_{14}(t|t-T) \\ P_{12}(t|t-T) & P_{22}(t|t-T) & P_{23}(t|t-T) & P_{24}(t|t-T) \\ P_{13}(t|t-T) & P_{23}(t|t-T) & P_{33}(t|t-T) & P_{34}(t|t-T) \\ P_{14}(t|t-T) & P_{24}(t|t-T) & P_{34}(t|t-T) & P_{44}(t|t-T) \end{pmatrix}.$$

The equations (29)-(40) define the EKF completely, when inserted in (28). The final step to compute the other cell interference estimate can be:

$$\hat{P}_{other}(t|t) = \hat{x}_2(t|t) - \hat{P}_N(t|t). \tag{41}$$

An example method is performed by a radio network node to implement a high performing estimator. The method may be performed by the scheduler, e.g., as load estimation functionality associated with the scheduler, to determine the other cell interference $P_{other}(t)$. In particular, the other cell interference estimate $\hat{P}_{other}(t)$ can be determined. The other cell interference $P_{other}(t)$ can express a sum of interferences present in the cell of interest due to wireless activities applicable at the time t in one or more cells other than in the cell of interest. The radio network node, and in particular the scheduler, can estimate the load utilization probability $p_{load}(t_1)$ to obtain a load utilization probability estimate $\hat{p}_{load}(t_1)$ applicable at a time $t=t_1$. The estimation can be made based on at least on a load utilization probability estimate $\hat{p}_{load}(t_0)$ and an interference-and-noise sum estimate $\hat{P}_{other}(t_0) + \hat{P}_N(t_0)$ applicable at time $t=t_0$. It should be noted that the term "t" enclosed in parentheses in the expressions without subscripts (e.g., $P_{other}(t)$, $p_{load}(t)$, etc.) is intended to indicate time variable in general, and the same term "t" enclosed in parentheses with subscripts (e.g., $P_{other}(t_0)$, $p_{load}(t_1)$, etc.) is intended to indicate a particular time. Thus, time $t_1$ may also be viewed as $t=t_1$ for example. The particular times $t_0$ and $t_1$ are assumed such that $t_1-t_0=T>0$. T can represent a duration between estimation times. In an embodiment, T is a positive integer multiple of a transmission time interval, preferably one (e.g., for 10 ms TTI but can be larger (e.g., 5 for 2 ms TTI). In the example method, it can be assumed the values of the quantities at time $t=t_0$ (or simply at time $t_0$) are known (have been measured, computed, received, or otherwise have been determined), and the values of one or more quantities at time $t=t_1$ are estimated or otherwise predicted. The radio network node can estimate the interference-and-noise sum $P_{other}(t_1)+P_N(t_1)$ to obtain the interference-and-noise sum estimate $\hat{P}_{other}(t_1)+\hat{P}_N(t_1)$ applicable at the time $t=t_1$. This estimation can be made based at least on the load utilization probability estimate $\hat{p}_{load}(t_0)$ and the interference-and-noise sum estimate $\hat{P}_{other}(t_0)+\hat{P}_N(t_0)$.

An example process performed by the radio network node to obtain the load utilization probability estimate $\hat{p}_{load}(t_1)$ and to obtain the interference-and-noise sum estimate $\hat{P}_{other}(t_1)+\hat{P}_N(t_1)$ is now discussed. A scheduled load factor $L_{own}(t_1-T_D)$ can be calculated. Here, $T_D$ can represent a delay between the calculation of the scheduled load factor and a time the schedule takes effect on an air interface. The scheduled load factor $L_{own}(t-T_D)$ can express an amount of the radio resource grants scheduled to be used by the cell terminals for uplink transmissions at the time t. A used load factor $\bar{L}_{own}(t_1-T_D)$ can be obtained. Note that the used load factor $L_{own}(t-T_D)$ can express an amount of the scheduled radio resource grants used by the cell terminals for the uplink transmissions at the time t. A load utilization $$\frac{L_{own}(t_1 - T_D)}{\tilde{L}_{own}(t_1 - T_D)}$$

can be measured or otherwise determined. Based on the measured load utilization $$\frac{L_{own}(t_1 - T_D)}{\tilde{L}_{own}(t_1 - T_D)},$$

the load utilization probability estimate $\hat{p}_{load}(t_1)$ can be obtained and the interference-and-noise sum estimate $\hat{P}_{other}(t_1)+\hat{P}_N(t_1)$ can be obtained.

Another example process performed by the radio network node to obtain the load utilization probability estimate $\hat{p}_{load}(t_1)$ and to obtain the interference-and-noise sum estimate $\hat{P}_{other}(t_1)+\hat{P}_N(t_1)$ is now discussed. A total wideband power $y_{RTWP}(t_1)$ can be measured. Based on the measured total wideband power $y_{RTWP}(t_1)$, the load utilization probability estimate $\hat{p}_{load}(t_1)$ can be obtained, and the interference-and-noise sum estimate $\hat{P}_{other}(t_1)+\hat{P}_N(t_1)$ can be obtained.

An example process performed by the radio network node to obtain the interference-and-noise sum estimate $\hat{P}_{other}(t_1)+\hat{P}_N(t_1)$ is now discussed. A gain factor $g(t_1)$ can be determined based on the load utilization probability estimate $\hat{p}_{load}(t_1)$ and the scheduled load factor $L_{own}(t_0)$. The measured total wideband power $y_{RTWP}(t_1)$ can be modelled as a combination of the interference-and-noise sum estimate $\hat{P}_{other}(t_1)+\hat{P}_N(t_1)$ weighted by the gain factor $g(t_1)$ and a measurement uncertainty $e_{RTWP}(t_1)$. Based on the measured total wideband power $y_{RTWP}(t_1)$ and the modelling thereof, the interference-and-noise sum estimate $\hat{P}_{other}(t_1)+\hat{P}_N(t_1)$ can be obtained.

An example process performed by the radio network node to determine the gain factor $g(t_1)$. A load factor bias $\Delta L_{other}(t_1)$ can be determined. The load factor bias $\Delta L_{own}(t)$ can express an error of the scheduled load factor $L_{own}(t)$. The gain factor $g(t_1)$ can be determined based on the load utilization probability estimate $\hat{p}_{load}(t_1)$, the scheduled load factor $L_{own}(t_0)$, and the load factor bias $\Delta L_{own}(t_1)$.

Once the interference-and-noise sum estimate $\hat{P}_{other}(t_1)+\hat{P}_N(t_1)$ is determined, the radio network node can estimate the other cell interference $P_{other}(t_1)$ to obtain the other cell interference estimate $\hat{P}_{other}(t_1)$. The estimation can be based at least on the interference-and-noise sum estimate $\hat{P}_{other}(t_1)+\hat{P}_N(t_1)$ and a thermal noise estimate $\hat{P}_N(t_1)$. Note that the interference-and-noise sum $P_{other}(t)+P_N(t)$ can express a sum of undesired signals, other than an own cell load $P_{own}(t)$.

It can then be seen that once the once the interference-and-noise sum estimate $\hat{P}_{other}(t_1)+\hat{P}_N(t_1)$ is determined, the other cell interference estimate $\hat{P}_{other}(t)$ can be arrived at if the thermal noise $\hat{P}_N(t)$ can be determined.

An example process performed by the radio network node to estimate the other cell interference $P_{other}(t_1)$ is now discussed. The thermal noise estimate $\hat{P}_N(t_1)$ can be obtained. In one embodiment, a thermal noise floor estimate $\hat{N}(t_1)$ corresponding to the cell of interest can be obtained as the thermal noise estimate $\hat{P}_N(t_1)$. The thermal noise estimate $\hat{P}_N(t_1)$ can be subtracted from the interference-and-noise sum estimate $\hat{P}_{other}(t_1)+\hat{P}_N(t_1)$ to obtain the other cell interference estimate $\hat{P}_{other}(t_1)$.

Another example process performed by the radio network node to obtain the load utilization probability estimate $\hat{p}_{load}(t_1)$ and to obtain the interference-and-noise sum estimate $\hat{P}_{other}(t_1)+\hat{P}_N(t_1)$ is now discussed. The extended Kalman filtering adapted for estimation is used. The load utilization probability $p_{load}(t)$ and the interference-and-noise sum $P_{other}(t)+P_N(t)$ can be modelled as first and second states $x_1(t)=p_{load}(t)$, $x_2(t)=P_{other}(t)+P_N(t)$ in a state vector $x(t)$ of a state space model. In this context, the state space model can be characterized through equations $x(t+T)=A(t)x(t)+B(t)u(t)+w(t)$ and $y(t)=c(x(t))+e(t)$. In these equations, $x(t)$ represents the state vector, $u(t)$ represents an input vector, $y(t)$ represents the output measurement vector, $w(t)$ represents a model error vector, $e(t)$ represents a measurement error vector, $A(t)$ represents a system matrix describing dynamic modes of the system, $B(t)$ represents an input gain matrix, $c(x(t))$ represents a measurement vector which is a function of the states of the system, $t$ represents the time and $T$ represents a sampling period. Thus, it is seen that modelling errors and measurement errors are incorporated in the state space model. The measured total wideband power $y_{RTWP}(t)$ and the measured load utilization $y_{loadUtilization}(t)$ can be modelled in the output measurement vector $y(t)$ of the state space model. A predicted state vector $\hat{x}(t_1|t_0)$ can be obtained. The predicted state vector $\hat{x}(t_1|t_0)$ includes first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{other}(t_0)+\hat{P}_N(t_0)$. In this context, the predicted state vector $\hat{x}(t|t-T)$ denotes a prediction of the state vector $x(t)$ based on information available up to time t−T. Recall from above that $t_1-t_0=T>0$. Thus, the predicted state vector $\hat{x}(t_1|t_0)$ denotes a prediction the state vector $x(t)$ at time $t=t_1$ based on information available up to time $t=t_0$. The time $t=t_0$ can be a time of initialization or a time of a previous iteration. The predicted state vector $\hat{x}(t_1|t_0)$ can be updated based on one or more measurements included in an output measurement vector $y(t_1)$ applicable at the time $t=t_1$ to obtain an estimated state vector $\hat{x}(t_1|t_1)=\hat{x}(t_1)$. The measurements can include the measured received total wideband power $y_{RTWP}(t_1)$ and the load utilization $y_{load}(t_1)$. Generally, the estimated state vector $\hat{x}(t|t)=\hat{x}(t)$ denotes an estimate of the state vector $x(t)$ based on information available up to time t. This step corresponds to an adjusting step of the Kalman filter algorithm in which the prediction made in the previous time (e.g., at time $t=t_0$) is adjusted according to measurements made in the current time (e.g., at time $t=t_1$). First and second estimated states $\hat{x}_1(t_1)$, $\hat{x}_2(t_1)$ can be obtained from the estimated state vector $\hat{x}(t_1)$ respectively as the load utilization probability estimate $\hat{x}_1(t_1)=\hat{p}_{load}(t_1)$ and the interference-and-noise sum estimate $\hat{x}_2(t_1)=\hat{P}_{other}(t_1)+\hat{P}_N(t_1)$. The estimated state vector $\hat{x}(t_1)$ is projected based at least on dynamic modes corresponding to the cell of interest to obtain a predicted state vector $\hat{x}(t_2|t_1)$, $t_2-t_1=T$. Here, the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-noise sum estimate $\hat{x}_2(t_1)=\hat{P}_{other}(t_1)+\hat{P}_N(t_1)$. This step corresponds to a predicting step of the Kalman filter algorithm in which future states are predicted based on current information. The steps can be iteratively performed. In one embodiment, the steps of updating the predicted state vector $\hat{x}(t_1|t_0)$ and of projecting the estimated state vector $\hat{x}(t_1|t_1)$ comprise performing a Kalman filter process to iteratively predict and update the state vector x(t) to obtain the estimated state vector $\hat{x}(t)$. Here, the estimated state vector $\hat{x}(t)$ includes the first and second estimated states $\hat{x}_1(t)$ and $\hat{x}_2(t)$ corresponding to the load utilization probability estimate $\hat{p}_{load}(t)$ and the interference-and-noise sum estimate $\hat{P}_{other}(t)+\hat{P}_N(t)$. In addition to the load utilization probability $p_{load}(t)$ and the interference-and-noise sum $P_{other}(t)+P_N(t)$ modelled as first and second states $x_1(t)=p_{load}(t)$, $x_2(t)=P_{other}(t)+P_N(t)$, third and fourth states $x_3(t)=\Delta \overline{L}_{own}(t)$, $x_4(t)=x_1(t-T)$ may also be modelled in the state vector x(t) of the state space model. The third state $x_3(t)=\Delta \overline{L}_{own}(t)$ can represent a load factor bias expressing an error of a scheduled load factor $L_{own}(t)$, and the fourth state $x_4(t)=x_1(t-T)$ can reflect that the load utilization probability measurement is subject to a delay corresponding to the sampling period T. The step of modelling load factor bias and delay need not be performed if the third and fourth states are not used, and therefore, can be considered as optional. However, the third and fourth states are preferred to be used.

An example process performed by the radio network node update predicted state vector $\hat{x}(t_1|t_0)$ when the third and fourth states are also modelled. The measured total wideband power $y_{RTWP}(t_1)$ applicable at the time $t=t_1$ can be modelled as:

$$y_{RTWP}(t_1) = \frac{x_2(t_1)}{1 - L_{own}(t_1 - T_D)x_1(t_1) + x_3(t_1)} + e_{RTWP}(t_1). \quad (42)$$

Here, $T_D$ can represent a delay between calculation of the schedule and a time the schedule takes effect on an air interface. Also, $e_{RTWP}(t)$ can represent a measurement error. The load utilization $y_{loadUtilization}(t_1)$ applicable at the time $t=t_1$ as can be modelled as:

$$y_{loadUtilization}(t_1)=x_4(t_1)+e_{loadUtilization}(t_1). \quad (43)$$

Again, $e_{loadUtilization}(t)$ can represent a measurement error. A measurement matrix $C(t_1)$ around the predicted state vector $\hat{x}(t_1|t_0)$ can be obtained. Here, the predicted state vector $\hat{x}(t_1|t_0)$ can include the first, second, third, and fourth predicted states $\hat{x}_1(t_1|t_0)$, $\hat{x}_2(t_1|t_0)$, $\hat{x}_3(t_1|t_0)$, $\hat{x}_4(t_1|t_0)$ which are predicted based on data up to the time $t=t_0$. In an embodiment, the measurement matrix $C(t_1)$ can be obtained by determining the measurement matrix $C(t_1)$ linearized around the predicted state vector $\hat{x}(t_1|t_0)$ such that $$C(t) = \left.\frac{\partial c(x)}{\partial x}\right|_{x=\hat{x}(t1|t0)}.$$

A Kalman gain matrix $K_f(t_1)$ can be obtained based on at least the measurement matrix $C(t_1)$, the measurement error vector $e(t_1)$, and a predicted covariance matrix $P(t_1|t_0)$ corresponding to the predicted state vector $\hat{x}(t_1|t_0)$. In an embodiment, the Kalman gain matrix $K_f(t_1)$ can be obtained by determining:

$$K_f(t_1)=P(t_1|t_0)C^T(t_1)(C(t_1)P(t_1|t_0)C^T(t)+R_2(t_1))^{-1} \quad (44)$$

in which $C^T(t)$ is a transpose of the measurement matrix $C(t)$ and $(R_2(t))$ is a measurement covariance matrix corresponding to the measurement error vector $e(t)$. The predicted state vector $\hat{x}(t_1|t_0)$ can be updated based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$. The estimated state vector $\hat{x}(t_1)$ can include the first, second, third, and fourth estimated states $\hat{x}_1(t_1)$, $\hat{x}_2(t_1)$, $\hat{x}_3(t_1)$, $\hat{x}_4(t_1)$. In an embodiment, the estimated state vector $\hat{x}(t_1|t_1)=\hat{x}(t_1)$ can be obtained through determining:

$$\hat{x}(t_1|t_1)=\hat{x}(t_1|t_0)+K_f(t_1)(y(t_1)-c(\hat{x}(t_1|t_0))). \quad (45)$$

Here $y(t_1)$ is the measurement vector, with components being the received total wideband power measurement and the load utilization measurement. The predicted covariance matrix $P(t_1|t_0)$ can be updated based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$. In an embodiment, the updated covariance matrix $P(t_1|t_1)$ can be obtained through determining:

$$P(t_1|t_1)=P(t_1|t_0)-K_f(t_1)C(t_1)P(t_1|t_0). \quad (46)$$

When there are first through fourth states, the projecting the estimated state vector $\hat{x}(t_1)$ can comprise projecting the estimated state vector $\hat{x}(t_1)$ based on at least the system matrix $A(t_1)$ to obtain the predicted state vector $\hat{x}(t_2|t_1)$. Here, the predicted state vector $\hat{x}(t_2|t_1)$ includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$. Then the updated covariance matrix $P(t_1|t_1)$ can be projected to obtain a predicted covariance matrix $P(t_2|t_1)$ based on at least the system matrix $A(t_1)$ and a system noise covariance matrix $R_1(t_1)$. The predicted state vector $\hat{x}(t_2|t_1)$ can be obtained by determining $\hat{x}(t_2|t_1)=A\hat{x}(t_1|t_1)+Bu(t_1)$, and the predicted covariance matrix $P(t_2|t_1)$ can be obtained through determining $P(t_2|t_1)=AP(t_1|t_1)A^T+R_1(t_1)$ in which $A^T$ is a transpose of the system matrix $A(t)$. Note that the input gain matrix $B(t)$ can be set to zero.

A non-exhaustive list of advantages of the nonlinear other cell interference algorithm discussed above includes:

Providing other cell interference with a bandwidth corresponding to one half of a TTI (one half is due to Nyqvists celebrated theorem that a signal sampled with a certain rate can only represent the signal with a bandwidth corresponding to half that rate—or so called aliasing occurs). Conventional algorithms typically have bandwidths corresponding to the order of tens of TTIs.

Providing estimates that are significantly more accurate than conventional algorithms.

Providing an extended range to provide useful other cell interference estimates, up to a total interference level of about 15 dB mean RoT. Previous algorithms only provide useful accuracies where the other cell interference power is in a small band well below the to dB mean RoT interference level.

Another advantage is in providing estimates of load utilization probability and other cell interference that can enhance the performance of the scheduler and the overall HetNet interference management. This can lead to (among others):

Enhancing the performance of the whole mobile broadband cellular system.

Simplifying network interference management by providing other cell interference levels at central nodes in the radio access network (RAN) and core network (CN).

Enabling self organization network (SON) functionality in wireless networks (such as WCDMA). Such functionality can be dependent on knowledge of the interference situations in different cells.

The nonlinear other cell interference algorithm discussed above addresses the problem 1 of providing an algorithm which at the same time provides other, e.g. neighbour, cell interference estimates with an inaccuracy less than 10-20%, and does so with close to TTI bandwidth, over the interesting power and load ranges.

accounts for a high bandwidth measured load utilization (herein also called measured load utilization probability). This is advantageous since WCDMA radio devices (UEs) may or may not utilize the power granted (scheduled) by the enhanced uplink (EUL) scheduler of the network node. This may lead to an inaccuracy of the load prediction step, where the scheduler bases its scheduling decision on a prediction of the resulting air interface load of the traffic it schedules.

However, the nonlinear other cell interference algorithm discussed above may conveniently be further improved, whereby the following potential problems 2-5 can be solved:

2. The numerical stability of even the basic Kalman filter is dependent on the possibility to perform a matrix inversion in the Kalman filter gain computation. Thus, there is a risk of a matrix division by zero during the Kalman filter gain matrix calculation. Since processing for the extended Kalman filter (EKF) is nonlinear, this risk may be even higher for the EKF.

3. The nonlinear measurement equation has a singularity occurring for a total load equal to 1. It is therefore convenient to ensure that there is always a small margin to this singularity.

4. A positive definiteness of the Riccati-equation (the P-matrix prediction and update) is needed to avoid numerical problems in the algorithm. This is not automatically guaranteed for the EKF.

5. All estimated states and predicted outputs of other cell interference algorithm may need to be checked so that they stay within intended ranges, the load utilization probability e.g. should preferably be kept between 0 and 1.

It is noted that computational problems 2-5 discussed here may need to be solved to obtain a functional deployed other cell interference algorithm for a network node.

In accordance with the present disclosure, any of the potential problems 2-5 can be solved by introducing "safety nets" in the other cell interference algorithm as follows (numbers referring to the corresponding potential problem 2-5 above):

2. A safety net which checks that the matrix inversion of the Kalman filter gain computation, does not lead to division with 0, or to a situation close to a division with 0. The check may be performed for a 4 state/2 measurement EKF for interference-and-noise sum estimation.

3. A safety net which checks the estimated states appearing in the nonlinear measurement equation of e.g. the 4-state/2-measurement EKF, that secures that the nonlinear measurement equation computation has a sufficient margin to the singularity appearing for total load equal to 1 in this measurement equation.

4. A safety net which checks that the Riccati-equation (the P-matrix prediction and update) is positive definite, for e.g. the 4 state/2 measurement EKF for the interference-and-noise sum estimation, thereby securing the stability of the EKF algorithm.

5. A safety net which checks that all estimated states and predicted outputs stay in the intended ranges, the load utilization probability e.g. needs to be kept between 0 and 1, said states and outputs being states and outputs of e.g. the 4 state/2 measurement EKF for interference-and-noise sum estimation.

Any or all of these safety nets may be used with the other cell interference estimation algorithm.

There is thus provided an other cell interference estimation algorithm that estimates the sum of all other cell interference, experienced in the own cell of the network node, using measurements of the load utilization and the total wideband received uplink power, as well as a computed own cell load. The algorithm may run in the RBS base band. The algorithm may be a nonlinear 4-state/2-measurement extended Kalman filter (EKF) that exploits the above safety nets, to ensure flawless execution over a significantly wider operating range than otherwise possible. It is stressed that crashes of the algorithm can occur without implementation of the safety nets disclosed herein.

It is noted that these safety nets may also be adapted for different other cell interference estimation algorithms than the example of the EKF algorithm discussed above.

In the following, some embodiments of the aspects in the Summary section of the present disclosure are further defined in view of the above discussion about the potential problems 2-5.

In some embodiments, the checking comprises checking whether the estimated load utilization probability is less than one, 1, by a first margin and larger than zero by a second margin. These embodiments are especially related to solving problems 3 and 5 above.

In some embodiments, the algorithm value represents a tentative update step comprising a denominator of a nonlinear measurement of the RTWP, where the checking comprises checking if said algorithm value is larger than zero, by a third margin, and lower than one, 1, by a fourth margin. These embodiments are especially related to solving problem 5 above.

In some embodiments, an extended Kalman filter (EKF) algorithm is used for the estimation of the load utilization probability and/or the estimation of the other cell interference. To use an EKF algorithm is an example of a situation where the present disclosure may be beneficially applied.

In some embodiments, the checking comprises checking whether a matrix of the Kalman filter gain matrix calculation has a size larger than zero by a fifth margin, thereby avoiding getting close to a division by zero. These embodiments are especially related to solving problem 2 above.

In some embodiments, the checking comprises checking whether the covariance matrices of a Riccati equation used for the estimating of the load utilization probability and the estimating of the interference-and-noise sum possess positive definiteness by a sixth margin. These embodiments are especially related to solving problem 4 above.

In some embodiments, a thermal noise component of the measured RTWP is estimated. Then, the estimating of the other cell interference may conveniently be based also on the estimated thermal noise. The measured UL RTWP may comprise/consist of different parts which all contribute to the RTWP. The RTWP may e.g. be divided into a thermal noise part, an own cell part (i.e. the total UL power originating from radio devices served by the own cell of the network node), and an other cell interference part (i.e. the total UL power originating from radio devices served by other, neighbouring, cells). Estimating the thermal noise may thus facilitate the estimation of the other cell interference.

Figure 3:
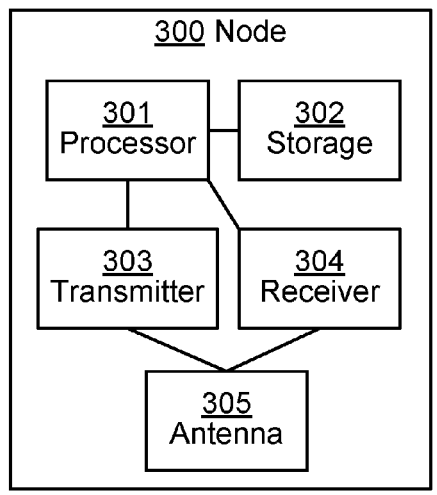
FIG. 3 is a schematic block diagram of an embodiment of a radio network node of the present disclosure.

FIG. 3 schematically illustrates an embodiment of a radio network node 300 (e.g. a radio base station, RBS) of the present disclosure. The node 300 may be configured for a WCDMA standard. The node 300 comprises a processor 301 e.g. a central processing unit (CPU). The processor 301 may comprise one or a plurality of processing units in the form of microprocessor(s). However, other suitable devices with computing capabilities could be comprised in the processor 301, e.g. an application specific integrated circuit (ASIC), a field programmable gate array (FPGA) or a complex programmable logic device (CPLD). The processor 301 is configured to run one or several computer program(s) or software stored in a storage unit 302 e.g. a memory. The storage unit is regarded as a computer readable means and may e.g. be in the form of a Random Access Memory (RAM), a Flash memory or other solid state memory, or a hard disk. The processor 301 is also configured to store data in the storage unit 302, as needed. The node 300 also comprises a transmitter 303, a receiver 304 and an antenna 305, which may be combined to form a transceiver or be present as distinct units within the node 300. The transmitter 303 is configured to cooperate with the processor to transform data bits to be transmitted over a radio interface to a suitable radio signal in accordance with the radio access technology (RAT) used by the Radio Access Network (RAN) via which the data bits are to be transmitted. The receiver 304 is configured to cooperate with the processor 301 to transform a received radio signal to transmitted data bits. The antenna 305 may comprise a single antenna or a plurality of antennas, e.g. for different frequencies and/or for MIMO (Multiple Input Multiple Output) communication. The antenna 305 is used by the transmitter 303 and the receiver 304 for transmitting and receiving, respectively, radio signals. The node 300 may also comprise a network interface (not shown) for communication with the radio network, e.g. a core network (CN). Other parts and functionalities of the node 300, such as the scheduler 601, are discussed in relation to FIG. 6 below.

Figure 4:
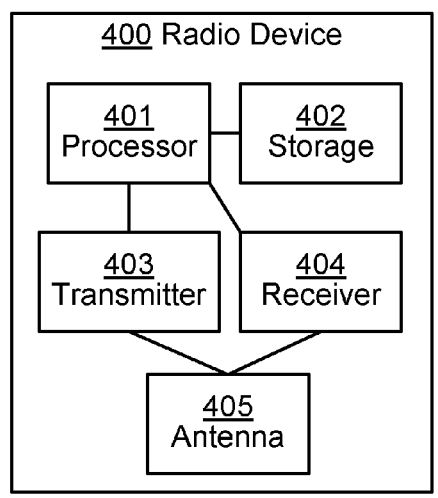
FIG. 4 is a schematic block diagram of an embodiment of a radio device of the present disclosure.

FIG. 4 schematically illustrates an embodiment of a radio device 400 of the present disclosure. The radio device 400 may be any device, mobile or stationary, enabled to communicate over the radio cannel in the communications network, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or PC. The radio device 400 is herein also called or exemplified as a User Equipment (UE) or a terminal. The radio device 400 comprises a processor or central processing unit (CPU) 401. The processor 401 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 401 is configured to run one or several computer program(s) or software stored in a storage unit or memory 402. The storage unit is regarded as a computer readable means and may e.g. be in the form of a Random Access Memory (RAM), a Flash memory or other solid state memory, or a hard disk. The processor 401 is also configured to store data in the storage unit 402, as needed. The radio device 400 also comprises a transmitter 403, a receiver 404 and an antenna 405, which may be combined to form a transceiver or be present as distinct units within the terminal 101. The transmitter 403 is configured to cooperate with the processor to transform data bits to be transmitted over a radio interface to a suitable radio signal in accordance with the ratio access technology (RAT) used by the radio access network (RAN) via which the data bits are to be transmitted. The receiver 404 is configured to cooperate with the processor 401 to transform a received radio signal to transmitted data bits. The antenna 405 may comprise a single antenna or a plurality of antennas, e.g. for different frequencies and/or for MIMO (Multiple Input Multiple Output) communication. The antenna 405 is used by the transmitter 403 and the receiver 404 for transmitting and receiving, respectively, radio signals.

Figure 5:
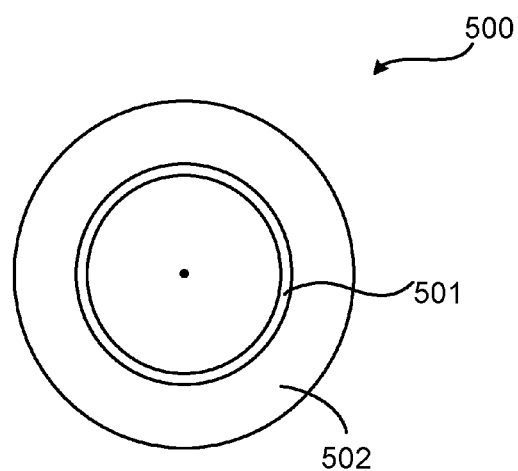
FIG. 5 is a schematic illustration of an embodiment of a computer program product of the present disclosure.

FIG. 5 illustrates a computer program product 500. The computer program product 500 comprises a computer readable medium 502 comprising a computer program 501 in the form of computer-executable components 501. The computer program/computer-executable components 501 may be configured to cause a radio network node 300, e.g. as discussed herein for estimating other cell interference in the radio network node 300 providing an own cell serving at least one radio device 400 in the radio network, to perform an embodiment of the method of the present disclosure. The computer program/computer-executable components may be run on the processing unit 301 of the node 300 for causing the node to perform the method. The computer program product 500 may e.g. be comprised in a storage unit or memory 301 comprised in the node 300 and associated with the processing unit 301. Alternatively, the computer program product may be, or be part of, a separate, e.g. mobile, storage means, such as a computer readable disc, e.g. CD or DVD or hard disc/drive, or a solid state storage medium, e.g. a RAM or Flash memory.

Figure 6:
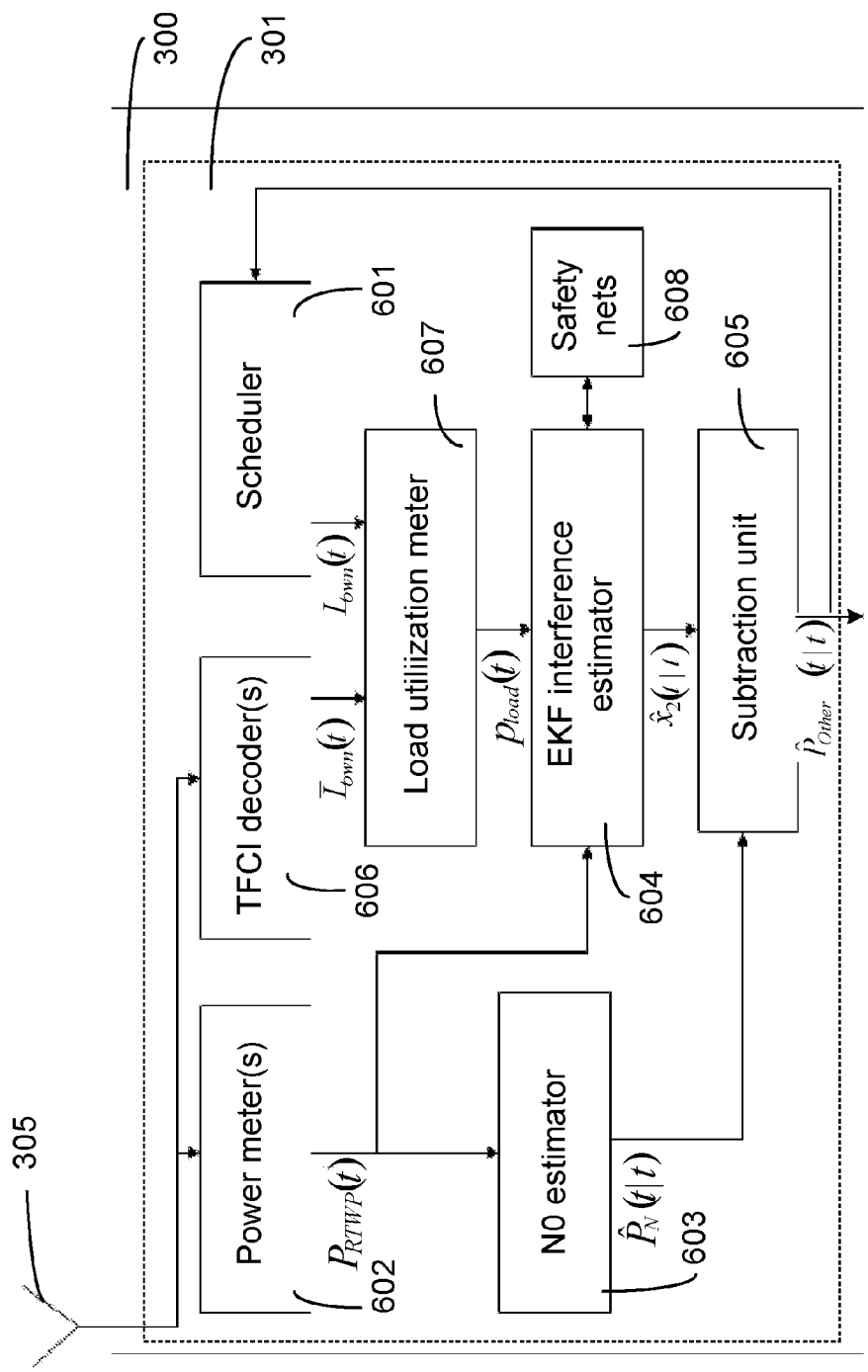
FIG. 6 is a schematic block diagram in more detail of an embodiment of a radio network node of the present disclosure.

FIG. 6 schematically illustrates an embodiment of a network node 300 of the present disclosure. The processor/processing circuitry 301 comprises a plurality of functionalities for performing a method of the present disclosure. These functionalities may be regarded as relating to a base band subsystem of the node 300. The processing functionalities comprises a scheduler 601 configured for scheduling i.a. UL resources to the radio devices 400 served by the network node/RBS 300. The scheduler 601 thus schedules a total UL load of the own cell. As discussed above, the node comprises an antenna 305 configured for receiving radio signals. A power meter 602 is configured to measure the RTWP of the radio signalling received via the antenna 305. Further, a TFCI decoder 606 is configured for decoding the radio signalling received via the antenna 305. Another functionality is a load utilization meter 607 which is configured for measuring the total load utilized by the by all the radio devices, served by the own cell, combined, in relation to the total load scheduled by the scheduler 601. Another functionality is an EKF interference estimator 604 configured for making the estimations of the load utilization probability and the interference-and-noise sum by means of an EKF algorithm in cooperation with a safety net functionality 608 configured for providing safety net for controlling the algorithm, e.g. one, several or all of the safety nets 2-5 discussed above. The EKF interference estimator 604 is configured to make the estimations based on input outputted from the load utilization meter 607 and the power meter 602. There is also an No estimator configured for estimating the thermal noise of the signalling received via the antenna 305. Thus, a subtraction unit functionality 605 can be configured to subtract the thermal noise from the estimations made by the EKF interference estimator 604. Thus, the subtraction unit 605 can output an estimated other cell interference power which is adjusted for the thermal noise. The estimated other cell interference value and/or the estimated load utilization is looped back to the scheduler for improved scheduling in a recursive manner.

Figure 7:
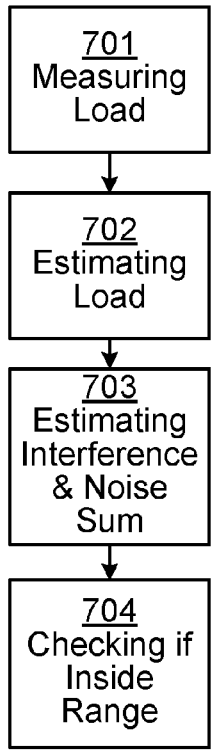
FIG. 7 is a schematic flow chart of an embodiment of a method of the present disclosure.

FIG. 7 is a flow chart of an embodiment of the method of the present disclosure. A load utilization, relating to the load utilized by the at least one served radio device is measured 701. The load is the total load utilized by the radio device(s) served by the own cell, and the load is in relation to the total scheduled load for said radio device(s) where a load of 1 implies that 100% of the scheduled load is utilized. A load utilization probability is estimated 702 based on the measured 701 load utilization and optionally on a previously estimated load utilization probability and/or a previously estimated interference-and-noise sum such that the estimation 702 is a recursive estimation. The interference-and-noise sum is then estimated 703 based on the measured 701 load utilization and the estimated 702 load utilization probability, and optionally on a measured 901 (see FIG. 9) received total wideband power (RTWP) and/or the previously estimated interference-and-noise sum such that the estimation 703 is a recursive estimation. The safety net(s) discussed herein are applied for the estimations 702 and/or 703 before, during, between or after the estimations in order to control the other cell interference algorithm. This comprises checking 704 whether the estimated 702 load utilization probability and/or estimated 703 interference-and-noise sum and/or any algorithm value derived from any of the estimates, is within a predefined range. That an algorithm value is derived from the estimation implies that the value is affected in the algorithm by the estimation. Such a value may need to be within a predefined range in order for the algorithm to operate properly.

Figure 8:
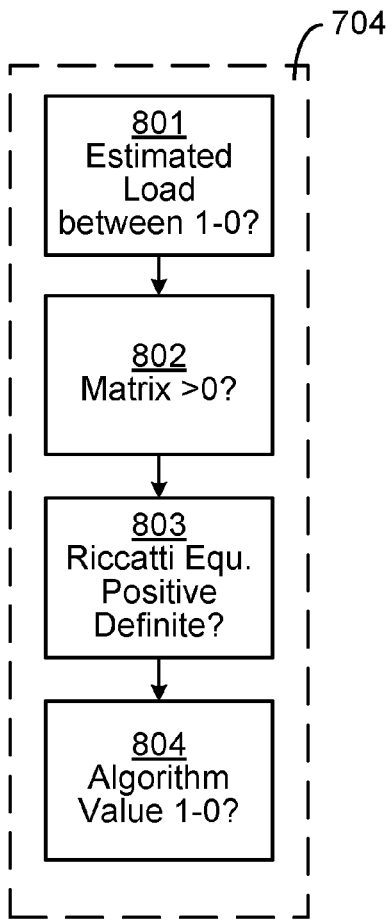
FIG. 8 is a schematic flow chart in more detail of an embodiment of a method of the present disclosure.

FIG. 8 is a flow chart illustrating different optional parts of the checking step 704 in FIG. 7. One, some or all of the parts may be used, and if more than one is used they can be performed in parallel or in sequence or a mixture thereof. They do not have to be performed in the same sequence as in the example of FIG. 8. In one part, the checking 704 of FIG. 7 comprises checking 801 whether the estimated load utilization probability is less than one (1) by a first margin and larger than zero by a second margin. In another part, the checking 704 of FIG. 7 comprises checking 804 if the algorithm value is larger than zero, by a third margin, and lower than one (1) by a fourth margin. In another part, the checking 704 of FIG. 7 comprises checking 802 whether a matrix of the Kalman filter gain matrix calculation has a size larger than zero by a fifth margin, thereby avoiding getting close to a division by zero. In another part, the checking 704 of FIG. 7 comprises checking 803 whether the covariance matrices of a Riccati equation used for the estimating 702 of the load utilization probability and/or the estimating 703 of the interference-and-noise sum possess positive definiteness by a sixth margin. It should be noticed that the terms "first", "second" etc. when denoting the first-sixth margins herein are only used to differentiate the margins from each other. Thus, e.g. the sixth margin can be used without having also used the first-fifth margins etc.

Figure 9:
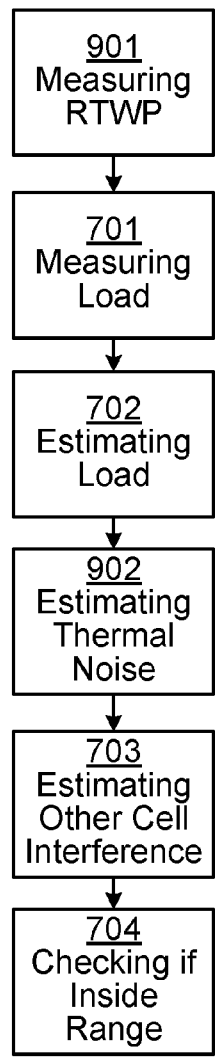
FIG. 9 is a schematic flow chart of another embodiment of a method of the present disclosure.

FIG. 9 is a flow chart illustrating another embodiment of the method of the present disclosure. The UL RTWP is measured 901. A load utilization, relating to the load utilized by the at least one served radio device is measured 701. The load is the total load utilized by the radio device(s) served by the own cell, and the load is in relation to the total scheduled load for said radio device(s) where a load of 1 implies that 100% of the scheduled load is utilized. A load utilization probability is estimated 702 based on the measured 701 load utilization and optionally on a previously estimated load utilization probability and/or a previously estimated interference-and-noise sum such that the estimation 702 is a recursive estimation. The thermal noise is measured 902. The interference-and-noise sum is estimated 703 based on the measured 701 load utilization, the estimated 702 load utilization probability, the estimated 902 thermal noise and the measured 901 received total wideband power (RTWP) and/or the previously estimated interference-and-noise sum such that the estimation 703 is a recursive estimation. The safety net(s) discussed herein are applied for the estimations 702 and/or 703 before, during, between or after the estimations in order to control the other cell interference algorithm. This comprises checking 704 whether the estimated 702 load utilization probability and/or estimated 703 interference-and-noise sum and/or any algorithm value derived from any of the estimates, is within a predefined range, as discussed above.

Example 1

Figure 10:
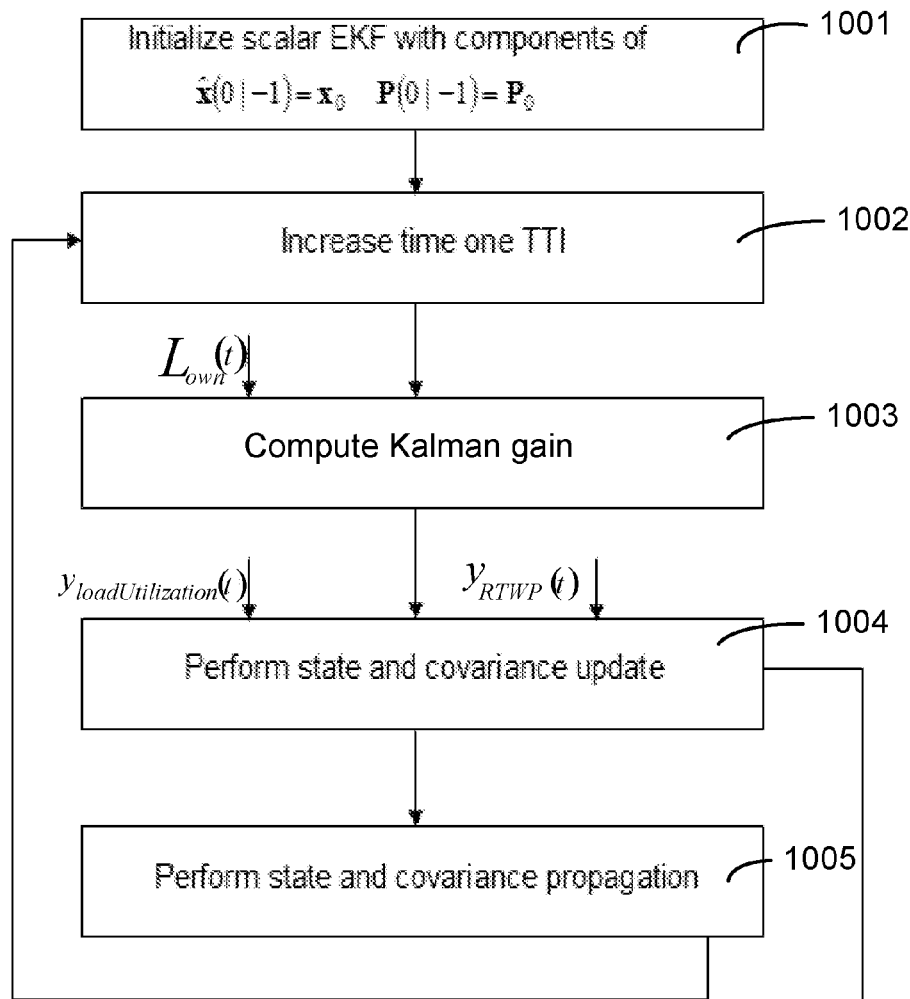
FIG. 10 is a flow chart of an exemplary embodiment of a method of the present disclosure.
Figure 10:
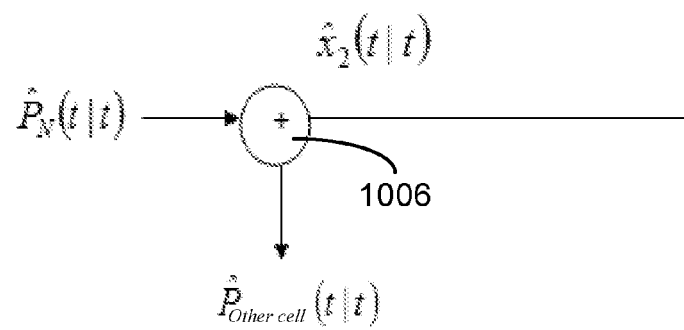

FIG. 10 is a flow chart illustrating an embodiment of the algorithm (28), discussed above for computing the other cell interference estimate as given by equation (41):

According to this example, the algorithm is performed without the use of safety nets.

The EKF is initialized 1001 with components of $\hat{x}(0|-1)=x_0$ and $P(0|-1)=P_0$. The time is increased 1002 by one TTI. The Kalman gain is computed 1003. A state and covariance update is performed 1004. The output from the performed 1004 update is then used for recursively obtaining 1006 the estimated other cell interference after subtraction of the estimated thermal noise $\hat{P}_N(t|t)$. The output from the performed 1004 update is also used for performing 1005 state and covariance propagation, with a feed-back loop to the step of increasing 1002 the time by one TTI.

Example 2

As stated above, the extended Kalman filter disclosed above may require safety nets in order to ensure a well behaved operation over a wider range of operating conditions.

Check 802 of matrix inversion (related to problem 2 above):

In equation (28) the following check is performed before the Kalman filter gain is computed, $$|(CPC^T+R_2)_{11}(t)(CPC^T+R_2)_{22}(t)-((CPC^T+R_2)_{12}(t))^2|>0 \qquad (47)$$

If the check fails, then the Kalman filter gain computation cannot be performed. A timer is started and if the problem persists during a pre-configured number of TTIs, the EKF is re-initiated and restarted. See FIG. 11.

Figure 11:
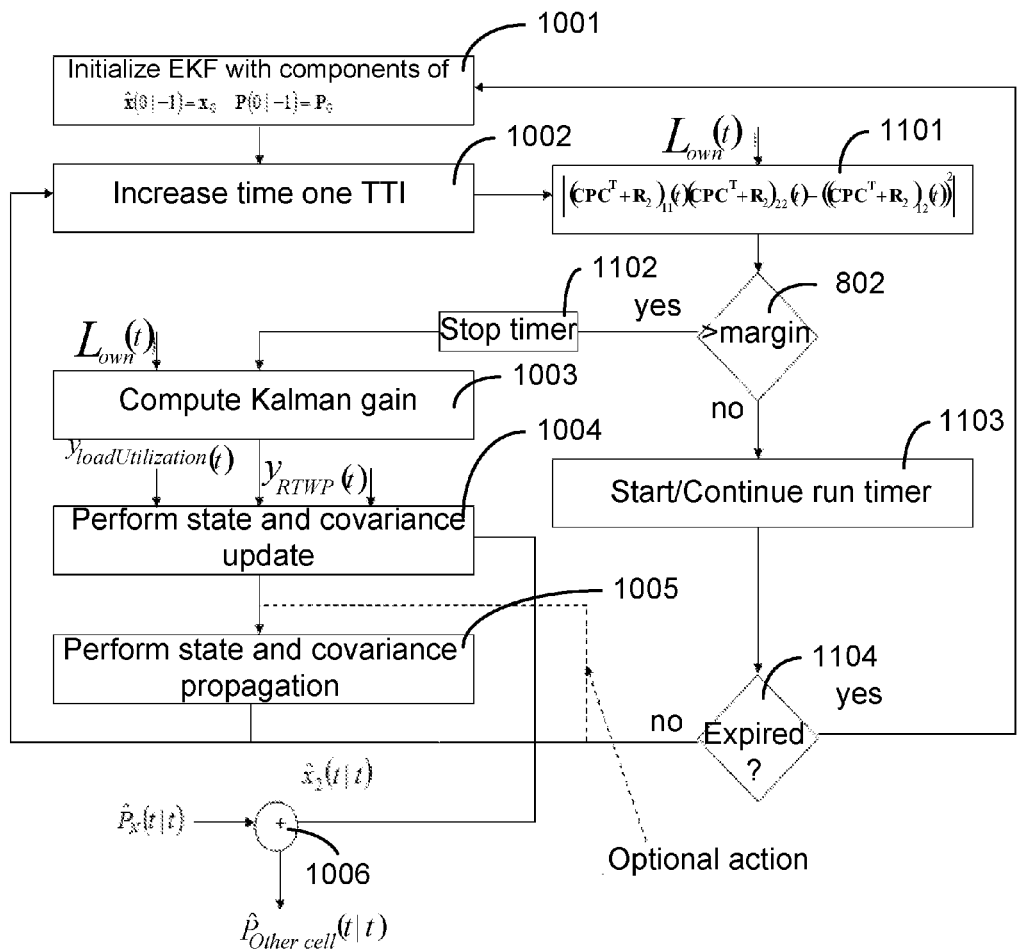
FIG. 11 is a flow chart of another exemplary embodiment of a method of the present disclosure.

FIG. 11 is a flow chart illustrating the embodiment of example 2. The EKF is initialized 1001 with components of $\hat{x}(0|-1)=x_0$ and $P(0|-1)=P_0$. The time is increased 1002 by one TTI. Equation (43) is then applied 1101. It is checked 802 whether the difference from zero is above or below the fifth margin (as discussed herein). If the difference is above the fifth margin, the timer is stopped 1102 (if it is running). Then, the Kalman gain is computed 1003 as in example 1. A state and covariance update is performed 1004. The output from the performed 1004 update is then used for recursively obtaining 1006 the estimated other cell interference after subtraction of the estimated thermal noise $\hat{P}_N(t|t)$. The output from the performed 1004 update is also used for performing 1005 state and covariance propagation, with a feed-back loop to the step of increasing 1002 the time by one TTI. If the difference is below the fifth margin, the timer is started 1103 (or is not stopped 1102). The timer continues to run until it the sufficient margin is obtained or until the timer expires 1104, in which case the EKF is re-initiated and restarted as indicated by the feed-back loop to the step of increasing 1002 the time by one TTI.

Example 3

Check 801 of Division in the Measurement Equation for RTWP in EKF (Related to Problem 3 Above)

In the EKF, a state update is performed at each iteration. In order to secure this update, it is checked that the nonlinear measurement equation for RTWP has a sufficient margin to load 1. Furthermore, it is checked that the denominator is positive. The check for equation (41) is $$0 \leq L_{lower} < L_{own}(t-T_D)\hat{x}_{1,i}(t|t-T_{TTI}) - \hat{x}_{3,i}(t|t-T_{TTI}) < L_{upper} < 1 \quad (48)$$

If the check fails, the update is not performed. $L_{lower}$ and $L_{upper}$ are the parameters that express the safety limits valid for the load, see FIG. 12.

Figure 12:
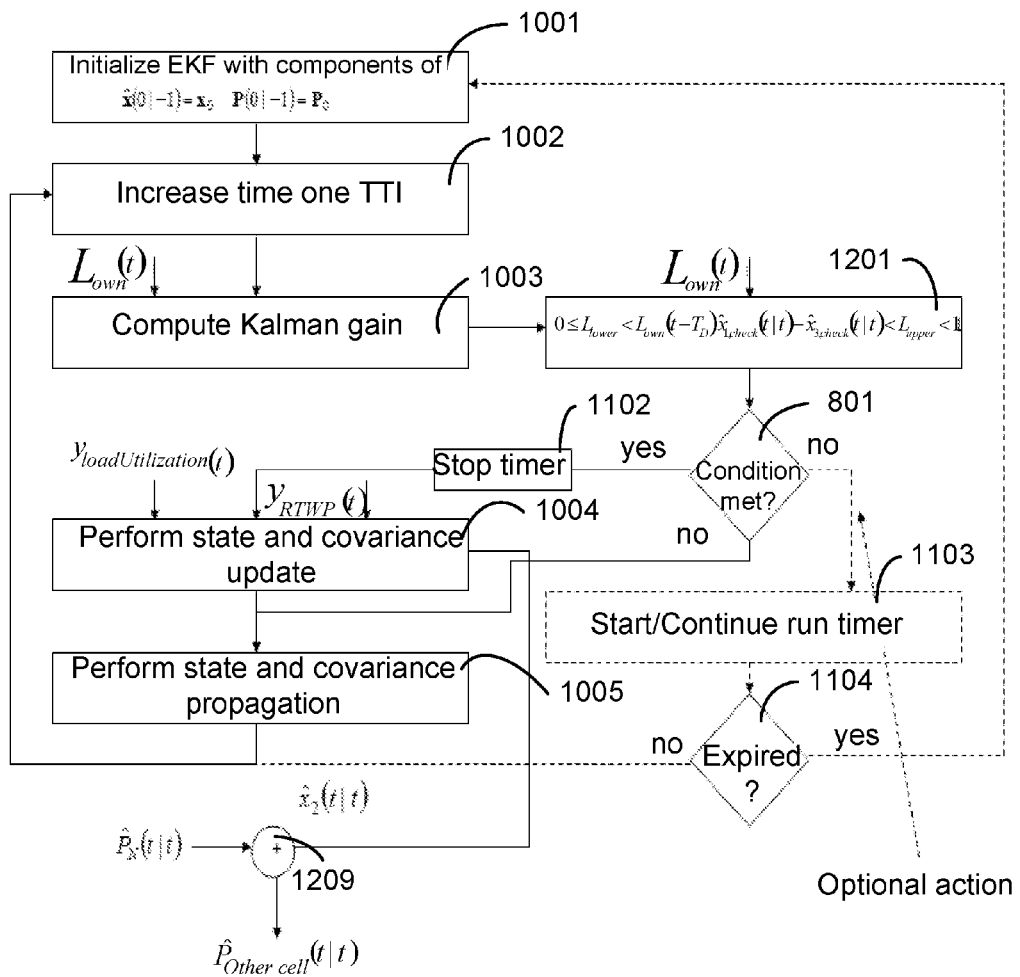
FIG. 12 is a flow chart of another exemplary embodiment of a method of the present disclosure.

FIG. 12 is a flow chart illustrating the embodiment of example 3. EKF is initialized 1001 with components of $\hat{x}(0|-1)=x_0$ and $P(0|-1)=P_0$. The time is increased 1002 by one TTI. Equation (48) is then applied 1201. It is checked 801 whether the measurement equation margin to one is above the first margin and whether the measurement equation margin to zero is above the second margin. If the conditions are met, the timer is stopped 1102 (if it is running). Then, the Kalmar gain is computed 1003 as in example 1. A state and covariance update is performed 1004. The output from the performed 1004 update is then used for recursively obtaining 1006 the estimated other cell interference after subtraction of the estimated thermal noise $\hat{P}_N(t|t)$. The output from the performed 1004 update is also used for performing 1005 state and covariance propagation, with a feed-back loop to the step of increasing 1002 the time by one TTI. If the conditions are not met, the step of performing 1004 the state and covariance update is skipped. Alternatively, if the conditions are not met, the timer is started 1103 (or is not stopped 1102). The timer then continues to run until it the sufficient margin is obtained or until the timer expires 1104, in which case the EKF is re-initiated and restarted as indicated by the feed-back loop to the step of increasing 1002 the time by one TTI.

Example 4

Check 804 of Tentative State Update (Related to Problem 5 Above)

Before a real update is performed tentative updated state variables are computed and the range of the tentatively updated states is checked in several ways. It is also checked that the nonlinear measurement equation for RTWP is not close to a divide by zero after a tentative update.

The checks include:

$$0 \leq p_{lower} < \hat{x}_{1,check}(t|t) < p_{upper} < 1 \quad (49)$$

$$0 \leq P_{I_{neighbor+N0}lower} < \hat{x}_{2,check}(t|t) < f_{upper} y_{RTWP}(t) \quad (50)$$

$$0 \leq L_{lower} < L_{own}(t-T_D)\hat{x}_{1,check}(t|t) - \hat{x}_{3,check}(t|t) < L_{upper} < 1 \quad (51)$$

If the checks 804 are not fulfilled, the update is not performed and a timer is started. In case the checks are not fulfilled for a pre-configured number of consecutive TTIs, the EKF is re-initialized and re-started. $p_{lower}$ and $p_{upper}$ are the parameters that express the safety limits on the load utilization. $P_{lower}$ expresses the lower bound on the estimated sum of other cell and thermal noise power, while the factor $f_{upper}$ make sure that the power estimate of the extended Kalman filter is always bounded. Note that this latter safety net is very important to handle any estimator instability. $L_{lower}$ and are the parameters that express the safety limits valid for the load. See FIG. 13.

Figure 13:
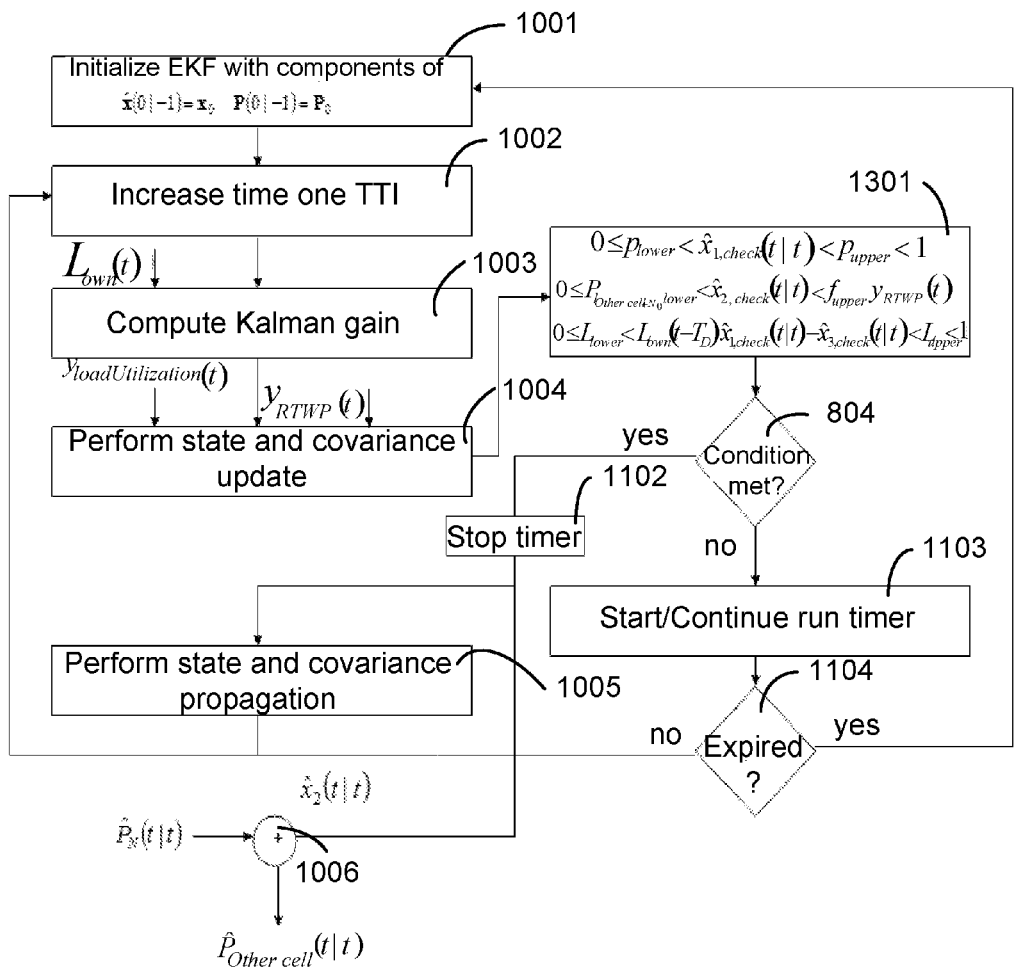
FIG. 13 is a flow chart of another exemplary embodiment of a method of the present disclosure.

FIG. 13 is a flow chart illustrating the embodiment of example 4. The EKF is initialized 1001 with components of $\hat{x}(0|-1)=x_0$ and $P(0|-1)=P_0$. The time is increased 1002 by one TTI. Equations (49), (50) and (51) are then applied 1301. It is checked 804 whether the conditions of the equations (49), (50) and (51) are met. If the conditions are met, the timer is stopped 1102 (if it is running). Then, the Kalmar gain is computed 1003 as in example 1. A state and covariance update is performed 1004. The output from the performed 1004 update is then used for recursively obtaining 1006 the estimated other cell interference after subtraction of the estimated thermal noise $\hat{P}_N(t|t)$. The output from the performed 1004 update is also used for performing 1005 state and covariance propagation, with a feed-back loop to the step of increasing 1002 the time by one TTI. If the conditions are not met, the timer is started 1103 (or is not stopped 1102). The timer then continues to run until it the sufficient margin is obtained or until the timer expires 1104, in which case the EKF is re-initiated and restarted as indicated by the feed-back loop to the step of increasing 1002 the time by one TTI.

Example 5

General Numerical Properties (Relates to Problem 4 Above and the Check 803 of the Riccati Equation)

The P-matrix iterations of the EKF needs to remain positive definite and symmetric in order for the EKF to remain stable. The symmetry is automatically preserved since the EKF equation (28) does assume symmetry and only update the upper-triangular (or equivalently the lower-triangular) parts of the P-matrix iterations. The preservation of positive definiteness is however a non-trivial issue.

Now, all MATLAB simulations performed so far indicate that positive definiteness is not a problem for the algorithm (28). However, this is not a proof. Furthermore, the MATLAB simulations are performed using double precision floating point computations, hence numerical problems are not likely to affect that result. A product implementation does however introduce a need to implement in fix-point arithmetic. This implementation must then be performed very carefully for the P-matrix equations, it may be necessary to use 8 byte fix point computations for these parts, a fact that is here defined as the safety net.

In case further safety nets are deemed necessary an eigenvalue computation may become needed, Other solutions may use range based detection followed by resets. An eigenvalue computation may be feasible, considering the fact that the filter order is limited to 4.

Example 6

Simulation Results

The basis for the data generation are a large set of UL power files generated in a high fidelity system simulator. The files represent bursty traffic, with varying mix of speech and data traffic, at different load levels.

These data files are then combined in different ways by a MATLAB code which generates the UL power components, i.e. own cell traffic, other/neighbour cell traffic, thermal noise and the summed up RTWP. The load factor of the own cell is also computed. The user can e.g.

Select the average power levels of the components, with respect to the thermal noise floor level.

Select the number of neighbours (other cells) used for other cell interference.

The load utilization probability of the own cell, fix or varying between two limits.

The loop delay of the load factor/utilization (related to grant loop delay).

Set daily load patterns, and perturb these day to day by a randomization algorithm.

A MATLAB reference code implementing the disclosed algorithm was used for performance simulations. Each run was 720000 10 ms TTIs, i.e. 2 h of traffic. The load utilization probability was varied. The variation was very fast with changes every few TTIs. The mean power levels of the other cell interference and the own cell were also varied between simulations, as was the load factor bias.

EKF Performance with Safety Nets

Figure 14:
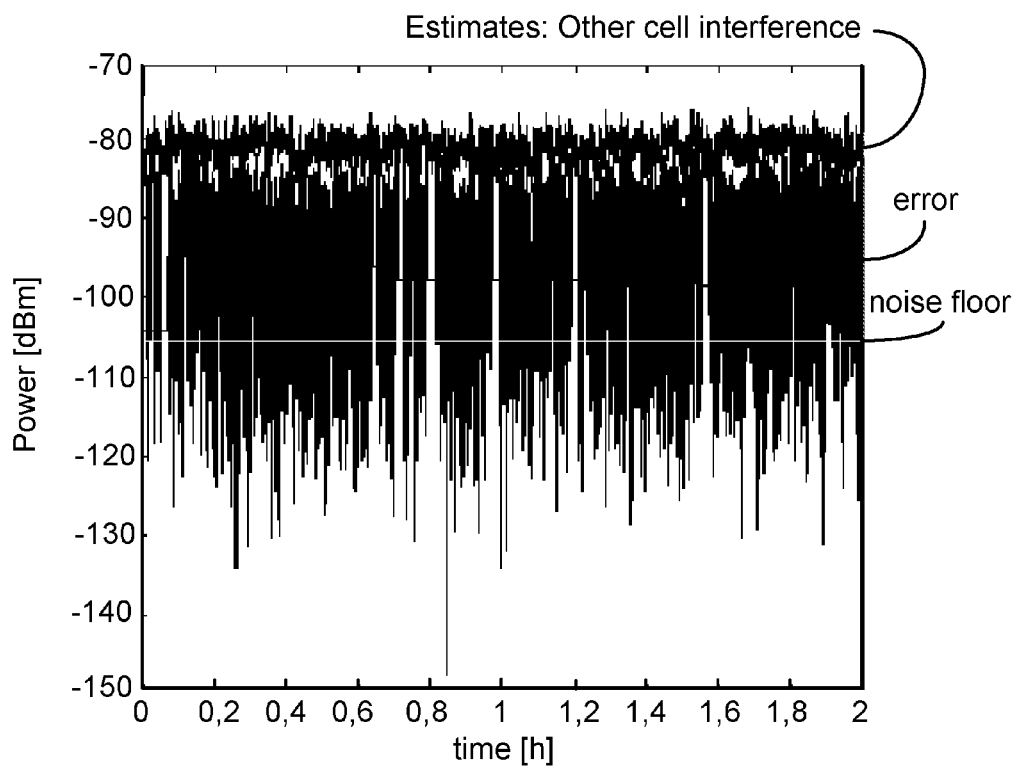
FIG. 14 is a simulation graph over estimated other cell interference.
Figure 15:
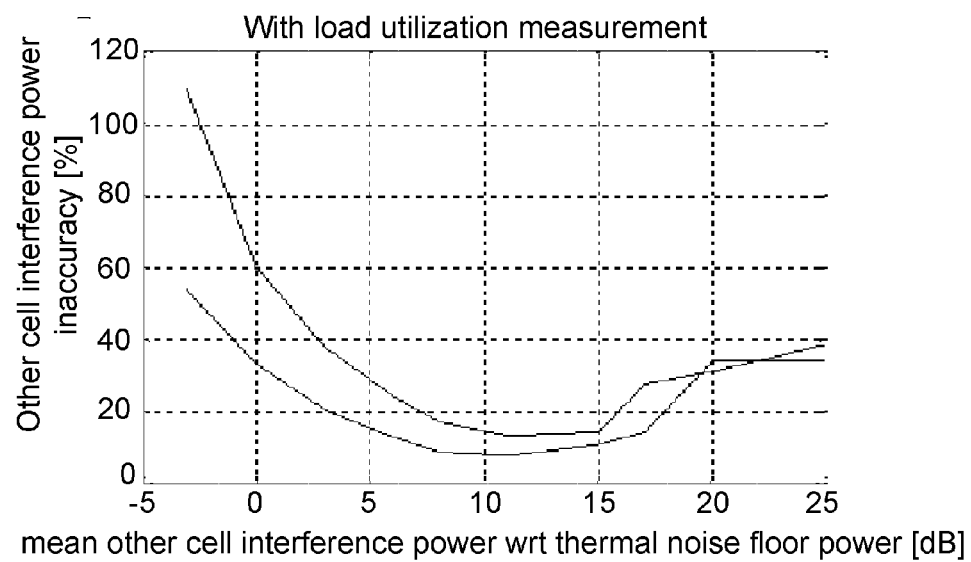
FIG. 15 is another simulation graph over estimated other cell interference.

FIGS. 14 and 15 represents a very high average RoT (Raise over thermal) case. The time plot of FIG. 14 shows that the safety nets of the algorithm then sets in and limits the estimator operation during relatively long periods. The knee seen between 15 and 20 dB in FIG. 15 is related to a load factor safety net, preventing estimated total load factors to exceed 0.99.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for estimating other cell interference in a radio network node providing an own cell serving at least one radio device in a radio network, wherein the radio network node comprises a transmitter and a receiver for communicating radio signals with said at least one radio device over a radio interface, the method comprising:
   measuring a load utilization, relating to the load utilized by said at least one radio device;
   estimating a load utilization probability based at least on the measured load utilization, a previously estimated load utilization probability and a previously estimated interference-and-noise sum;
   estimating an interference-and-noise sum based at least on the measured load utilization, a measured received total wideband power, RTWP, of the radio signals received by the receiver via an antenna of the radio network node, the estimated load utilization probability and the previously estimated interference-and-noise sum;
   checking whether the estimated load utilization probability and/or estimated interference-and-noise sum and/or any value derived from any of the estimates, is within a predefined range; and
   based on the checking, scheduling a transmission to reduce cell interference to optimize scheduling and uplink powers.

2. The method of claim 1, wherein the checking comprises checking whether the estimated load utilization probability is less than one, 1, by a first margin and larger than zero by a second margin.

3. The method of claim 1, wherein said value represents a tentative update step comprising a denominator of a nonlinear measurement of the RTWP, where the checking comprises checking if said value is larger than zero, by a third margin, and lower than one, 1, by a fourth margin.

4. The method of claim 1, wherein an extended Kalman filter, EKF, algorithm is used for the estimation of the load utilization probability and the estimation of the interference-and-noise sum.

5. The method of claim 4, wherein the checking comprises checking whether a matrix of the Kalman filter gain matrix calculation has a size larger than zero by a fifth margin, thereby avoiding getting close to a division by zero.

6. The method of claim 4, wherein the checking comprises checking whether the covariance matrices of a Riccati equation used for the estimating of the load utilization probability and the estimating of the interference-and-noise sum possess positive definiteness by a sixth margin.

7. The method of claim 4, further comprising:
   estimating a thermal noise part of the RTWP, wherein the estimating of the other cell interference is based on the estimated thermal noise.

8. A radio network node configured for providing an own cell serving at least one radio device in a radio network, the node comprising:
   a transmitter and a receiver for communication of radio signals with said at least one radio device over a radio interface;
   a processor; and
   a storage unit storing instructions when executed by the processor, cause the node to:
   measure a load utilization, relating to the load utilized by the at least one radio device;
   estimate a load utilization probability based at least on the measured load utilization, a previously estimated load utilization probability and a previously estimated interference-and-noise sum;
   estimate an interference-and-noise sum based at least on the measured load utilization, a measured received total wideband power, RTWP, of the radio signals received by the receiver via an antenna of the radio network node, the estimated load utilization probability and the previously estimated interference-and-noise sum;
   check whether the estimated load utilization probability and/or estimated interference-and-noise sum and/or any value derived from any of the estimates, is within a predefined range; and
   based on the checking, schedule a transmission to reduce cell interference to optimize scheduling and uplink powers.

9. A radio network node configured for providing an own cell serving at least one radio device in a radio network, wherein the radio network node comprises a transmitter and a receiver for communicating radio signals with said at least one radio device over a radio interface, the node comprising one or more processors configured for:
   measuring a load utilization, relating to the load utilized by said at least one radio device;
   estimating a load utilization probability based at least on the measured load utilization, a previously estimated load utilization probability and a previously estimated interference-and-noise sum;
   estimating an interference-and-noise sum based at least on the measured load utilization, a measured received total wideband power, RTWP, of the radio signals received by the receiver via an antenna of the radio network node, the estimated load utilization probability and the previously estimated interference-and-noise sum;

checking whether the estimated load utilization probability and/or estimated interference-and-noise sum and/or any value derived from any of the estimates, is within a predefined range; and based on the checking, schedule a transmission to reduce cell interference to optimize scheduling and uplink powers.

10. A radio network node configured for providing an own cell serving at least one radio device in a radio network, wherein the radio network node comprises a transmitter and a receiver for communicating radio signals with said at least one radio device over a radio interface, the node comprising:

measurement circuitry configured for estimating a load utilization, relating to the load utilized by said at least one radio device;

processing circuitry configured for estimating a load utilization probability based at least on the measured load utilization, a previously estimated load utilization probability and a previously estimated interference-and-noise sum;

processing circuitry configured for estimating an interference-and-noise sum based at least on the measured load utilization, a measured received total wideband power, RTWP, of the radio signals received by the receiver via an antenna of the radio network node, the estimated load utilization probability and the previously estimated interference-and-noise sum;

processing circuitry configured for checking whether the estimated load utilization probability and/or estimated interference-and-noise sum and/or any value derived from any of the estimates, is within a predefined range; and processing circuitry configured for, based on the checking, schedule a transmission to reduce cell interference to optimize scheduling and uplink powers.

11. A computer program product comprising a non-transitory computer readable storage medium embodied with computer-executable components to be executed by a processor comprised in a radio network node to perform the method of claim 1.

12. A non-transitory computer readable storage medium, having stored thereon, a set of computer-executable instructions for estimating other cell interference in a radio network node providing an own cell serving at least one radio device in a radio network, wherein the radio network node comprises a transmitter and a receiver for communicating radio signals with said at least one radio device over a radio interface, said computer executable instructions when run on a processor of the radio network node, cause the radio network node to:

measure a load utilization, relating to the load utilized by said at least one radio device;

estimate a load utilization probability based at least on the measured load utilization, a previously estimated load utilization probability and a previously estimated interference-and-noise sum;

estimate an interference-and-noise sum based at least on the measured load utilization, a measured received total wideband power, RTWP, of the radio signals received by the receiver via an antenna of the radio network node, the estimated load utilization probability and the previously estimated interference-and-noise sum;

check whether the estimated load utilization probability and/or estimated interference-and-noise sum and/or any value derived from any of the estimates, is within a predefined range; and based on the checking, schedule a transmission to reduce cell interference to optimize scheduling and uplink powers.

13. A computer program product comprising a non-transitory computer readable storage medium embodied with the computer-executable instructions of claim 12.

* * * * *